United States Patent [19]

Putterman et al.

[11] Patent Number: 5,659,173

[45] Date of Patent: Aug. 19, 1997

[54] CONVERTING ACOUSTIC ENERGY INTO USEFUL OTHER ENERGY FORMS

[75] Inventors: Seth J. Putterman, Sherman Oaks; Bradley Paul Barber, Northridge; Robert Anthony Hiller; Ritva Maire Johanna Löfstedt, both of Los Angeles, all of Calif.

[73] Assignee: The Regents of the University of California, Oakland, Calif.

[21] Appl. No.: 201,113

[22] Filed: Feb. 23, 1994

[51] Int. Cl.$^6$ .................................................. G01T 1/20
[52] U.S. Cl. .................. 250/361 C; 376/102; 376/149; 422/20; 422/52; 422/128
[58] Field of Search ................... 250/361 C; 376/102, 376/149; 422/20, 52, 128

[56] References Cited

U.S. PATENT DOCUMENTS

| | | |
|---|---|---|
| 4,333,796 | 6/1982 | Flynn . |
| 4,948,975 | 8/1990 | Erwin et al. ........................ 422/52 |
| 4,968,395 | 11/1990 | Pavelle et al. ..................... 204/130 |

FOREIGN PATENT DOCUMENTS

| | | |
|---|---|---|
| 2-281185 | 11/1990 | Japan . |
| 3-67196 | 3/1991 | Japan . |
| 3-53195 | 3/1991 | Japan . |
| WO90/10935 | 9/1990 | WIPO . |

OTHER PUBLICATIONS

Uber den Einfluss der Ultraschallwellen auf chemische Prozesse, Von H. Beuthe (no translation available).
Academy of Sciences article dated Mar. 20, 1993, "Chimie Minerale", noted by Mme. Réchid (no translation available).
Luminescenz im ultraschallbeschickten Wasser. Kurze Mittelung Von H. Frenzel und H. Schultes, Koln/Rh. (no translation available).

*C&EN;* Dagani, Jun. 5, 1995, "Cold Fusion Believer Turned Skeptic Crusades for More Rigorous Research", pp. 34–39.
*International Herald Tribune;* Brown, Dec. 22, 1994, "Cold Fusion is Back: It's Stil A Long Shot" pp. 2, 3 & 5.
*Scientific American;* Putterman, Feb. 1995, "Sonoluminescence: Sound Into Light" pp. 46–51.

(List continued on next page.)

*Primary Examiner*—Georgia Y. Epps
*Assistant Examiner*—Thomas Robbins
*Attorney, Agent, or Firm*—Merchant, Gould, Smith, Edell, Welter & Schmidt

[57] ABSTRACT

Sonoluminescence is an off-equilibrium phenomenon in which the energy of a resonant sound wave in a liquid is highly concentrated so as to generate flashes of light. The conversion of sound to light represents an energy amplification of eleven orders of magnitude. The flashes which occur once per cycle of the audible or ultrasonic sound fields can be comprised of over one million photons and last for less 100 picoseconds. The emission displays a clocklike synchronicity; the jitter in time between consecutive flashes is less than fifty picoseconds. The emission is blue to the eye and has a broadband spectrum increasing from 700 nanometers to 200 nanometers. The peak power is about 100 milliWatts. The initial stage of the energy focusing is effected by the nonlinear oscillations of a gas bubble trapped in the liquid. For sufficiently high drive pressures an imploding shock wave is launched into the gas by the collapsing bubble. The reflection of the shock from its focal point results in high temperatures and pressures. The sonoluminescence light emission can be sustained by sensing a characteristic of the emission and feeding back changes into the driving mechanism. The liquid is in a sealed container and the seeding of the gas bubble is effected by locally heating the liquid after sealing the container. Different energy forms than light can be obtained from the converted acoustic energy. When the gas contains deuterium and tritium there is the feasibility of the other energy form being fusion, namely including the generation of neutrons.

96 Claims, 23 Drawing Sheets

OTHER PUBLICATIONS

Light Scattering Measurements of the Repetitive Supersonic Implosion of a Sonoluminescing Bubble, Bradley P. Barber and Seth J. Putterman, Physical Review Letters, vol. 69, No. 26, 28 Dec. 1992.

Toward a hydrodynamic theory of sonoluminescence, Ritva Lofstedt, Bradley P. Barber, and Seth J. Putterman, Phys. Fluids A 5 (11), Nov. 1993.

Effect of Noble Gas Doping in Single–Bubble Sonoluminescence, Science, vol. 265, pp. 248–250, 14 Oct. 1994.

Observation of synchronous picosecond sonoluminescence, Bradley P. Barber and Seth J. Putterman, Letters to Nature, vol. 352, 24 Jul. 1991.

Spectrum of Synchronous Picosecond Sonoluminescence, Robert Hiller, Seth J. Putterman, and Bradley P. Barber, Physical Review Letters, vol. 69, No. 8, 24 Aug. 1992.

Abstracts from J. Acoust. Soc. Am., vol. 89, No. 4, Pt. 2, Apr. 1991, p. 1885, 121st Meeting: Acoustical Society of America; and vol. 91, No. 4, Pt. 2, Apr. 1992, 123rd Meeting: Acoustical Society of America.

Resolving the picosecond characteristics of synchronous sonoluminescence, Bradley P. Barber, Robert Hiller, Katsushi Arisaka, Harold Fetterman, and Seth Putterman, J. Acoust. Soc. Am. 91 (5), May 1992.

Theory of long wavelength acoustic radiation pressure, Ritva Lofstedt and Seth Putterman, J. Acoust. Soc. Am. 90 (4), Pt. 1, Oct. 1991.

Sonoluminescence from Stable Cavitation, T.K. Saksena and W.L. Nyborg, The Journal of Chemical Physics, vol. 53, No. 5, Sep. 1976.

Sonoluminescence and sonochemical reactions in cavitation fields. A Review, M.A. Margulis, Ultrasonics, Jul. 1985.

Sonoluminescence, R.E. Verrell and C.M. Sehgal, Ultrasonics, 1987, vol. 25, Jan.

Abstract, J. Acoust. Soc. Am. Suppl. 1, vol. 87, Spring 1990, "EEE7. Sonoluminescence from single bubbles". D. Felipe Gaitan and Lawrence A. Crum.

The Chemical Effects of High Frequency Sound Waves, I. Preliminary Survey, William T. Richards and Alfred L. Loomis, ACS Journal, vol. 89, 1927.

Oxidations Promoted by Ultrasonic Radiation, F.O. Schmitt, C.H. Johnson and A.R. Olson, ACS Journal, vol. 51, 1929.

Sonoluminescence from water containing dissolved gases, F. Ronald Young, J. Acoust. Soc. Am., vol. 60, No. 1, Jul. 1978.

Study of the Mechanism of Sonoluminescence. II. Form of the Light Pulse in Sonoluminescence, A.K. Kurochkin, E.A. Smorodov, R.V. Valitov, and M.A. Margulis, Russian Journal of Physical Chemistry, 60 (5), 1986.

Influence of Radiation on the Cavitation Threshold of Degassed Water, R.D. Finch, The Journal of the Acoustical Society of America, vol. 36, No. 12, 2287–2292, Dec. 1964.

On the Pressure Developed in a Liquid During the Collapse of a Spherical Cavity, Philosophical Magazine, vol. XXXIV, pp. 94–98, 1917.

Studies of the Threshold–of–Cavitation Noise in Liquid Helium, R.D. Finch, Taylor G. J. Wang, R. Kagiwada, M. Barmatz and Isadore Rudnick, The Journal of the Acoustical Society of America, vol. 40, No. 1, 211–218, Jul. 1966.

Sonoluminescence, Alan J. Walton and Geo T. Reynolds, Advanced in Physics, 1984, vol. 33, No. 6, 595–660.

I. Amato, Making Light of Sound, Research News, Mar. 20, 1992, p. 1511.

C. Suplee, Searching for Nature's Message in a Bottle of Glowing Water, The Washington Post, Aug. 12, 1991.

B. Levi, Light Comes From Ultrasonic Cavitation in Picosecond Pulses, Physics Today, Nov. 1991, pp. 17–18.

Barber et al., Resolving the Picosecond Characteristics of Synchronous Sonoluminescence, Nature, vol. 352, Jul. 25, 1991.

Barber et al., Observation of Synchronous Picosecond Sonoluminescence, Nature, vol., 352, Jul. 25, 1991.

Barber et al., Light Scattering Measurements of the Repetitive Supersonic Implosion of a Sonoluminescing Bubble, Physical Review Letters, vol. 69, No. 26, Dec. 28, 1992.

Hiller, et al. Spectrum of Synchronous Picosecond Sonoluminescence, Physical Review Letters, vol. 69, No. 8, Aug. 24, 1992.

B. Barber, Synchronous Picosecond Sonoluminescence, Ph.D. Dissertation, Jun. 1992.

Visible Cavitation in Liquid Helium, R. D. Finch and Taylor G. J. Wang, reprinted from The Journal of Acoustical Society of America, vol. 39, No. 3, 311–314, Mar. 1966.

Sonoluminescence Intensity as a Function of Bulk Solution Temperature, C. Sehgal, R.G. Sutherland, and R. E. Verrall, J. Phys. Chem., 1980, 84, 525–528.

The Solubility of Nitrogen and Air in Liquids, Rubin Battino, Timothy R. Rettich, and Toshihiro Tominaga, J. Phys. Chem. Ref. Data, vol. 13, No. 2, 1984.

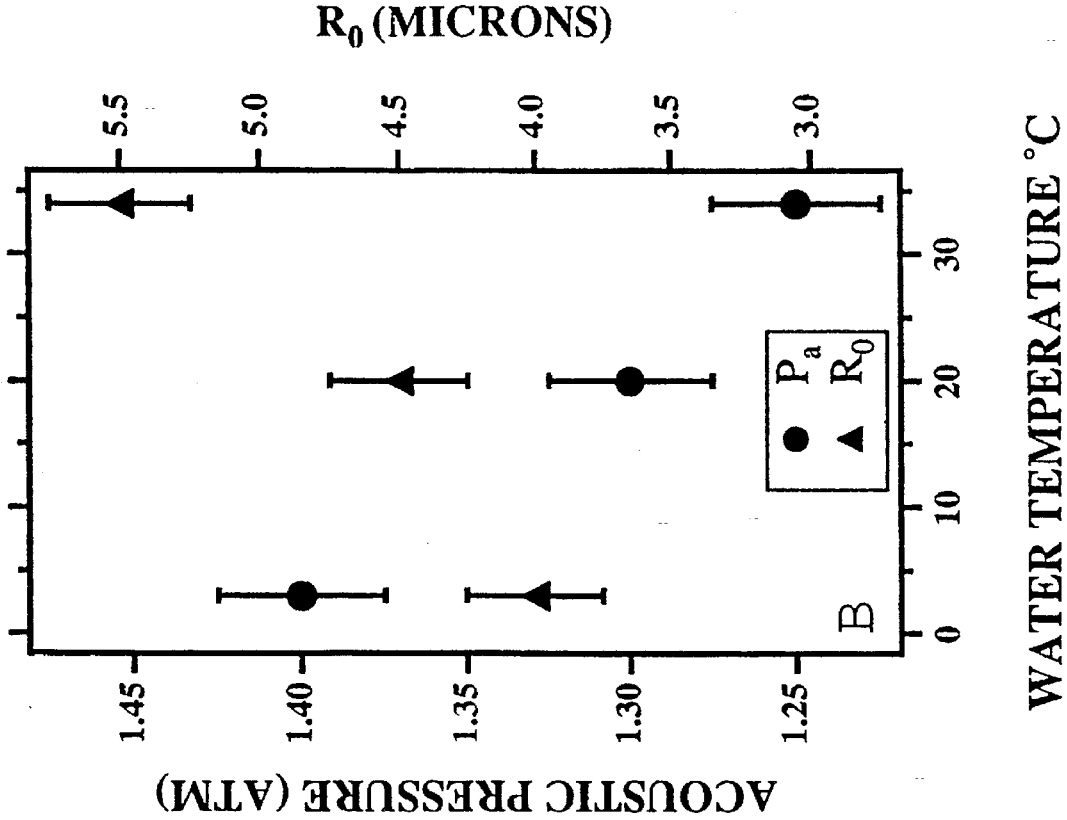
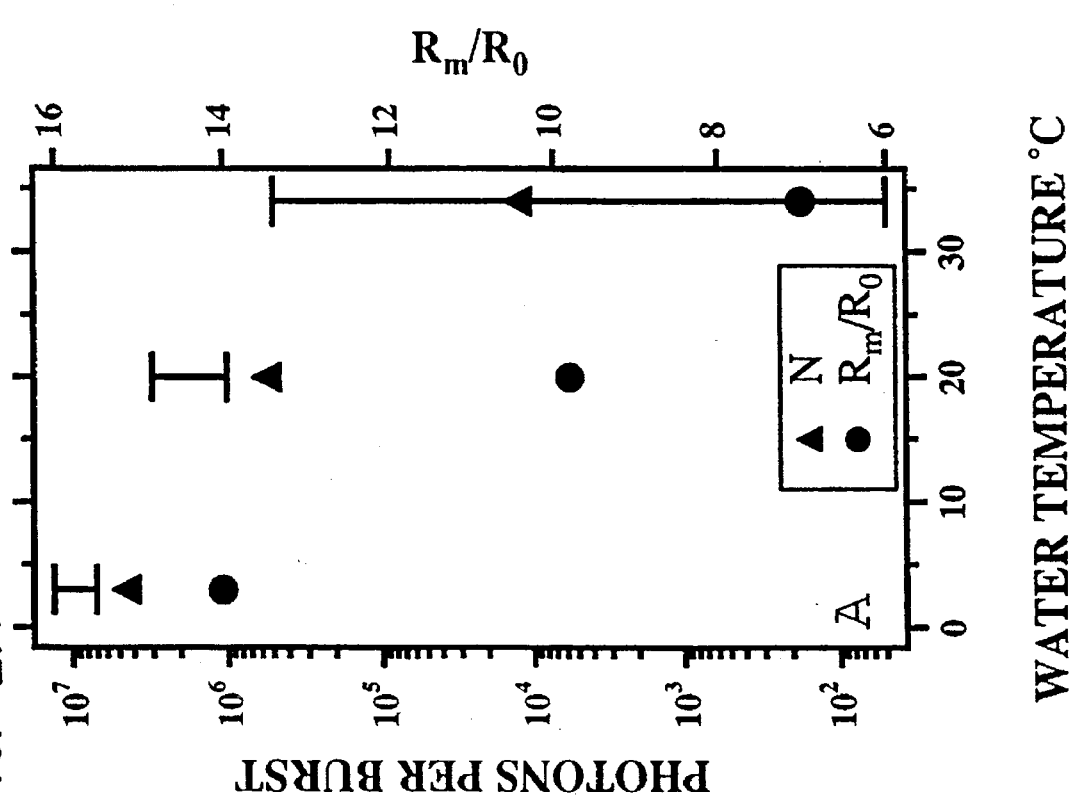
FIG. 2B
FIG. 2A

Frequency of the drive (Hz)

CONVERTING ACOUSTIC ENERGY INTO USEFUL OTHER ENERGY FORMS

I. BACKGROUND

Being able to convert and concentrate acoustic energy into other energy forms can provide very significant uses.

It is possible to convert acoustic energy into light energy whose characteristics provide multiple new applications in physics, chemistry, biology and many other sciences, technologies and industries. In particular this invention relates to the conversion of the energy of a resonant sound field into flashes of light whose duration is in the range of 100 picoseconds and whose spectrum is broadband. These flashes of light occur with clock-like synchronicity with a repetition rate set by the acoustic frequency represent an energy concentration of 11 orders of magnitude.

The invention is further concerned with the generation of all other energy forms which could result from a concentration of the acoustic energy. Since the limit of the energy focusing mechanism is undetermined such energy forms would include localized hot spots, UV radiation, x-rays, fusion and by-products of such acoustic energy conversion and concentration.

It is known to be possible to convert acoustic energy into light energy. Significant limitations exist in controlling that light energy and in rendering the light energy useful. To date therefore no technological use has been possible for such converted energy, and the conversion has remained a scientific curiosity.

There is a need to have useful new energy forms.

Throughout this application reference will be made to different texts. These texts are listed in the bibliography. The contents of these texts are incorporated by reference herein.

II SUMMARY

By this invention there is provided a technique to concentrate and convert acoustic energy into highly useful different energy forms.

According to the invention there is provided a method of highly concentrating and converting acoustic energy into a different energy form. There is created a gaseous bubble in a liquid in a container. The bubble is located in the liquid under the action of acoustic energy applied to the liquid. Compressing and decompressing the bubble is effected under the action of a resonating pressure applied to the liquid by the acoustic energy.

Increasing the resonating pressure generates from the bubble an emission of a different energy form. This energy form can be sonoluminescence, fusion, x-rays, neutrons, and heat. SL is light energy obtained from the acoustic energy input.

In one preferred form of the invention, a characteristic of the different energy form is sensed and changes in the characteristics are fed back to the means for generating the acoustic energy thereby to sustain the generation of the different energy form. In a different preferred form of the invention this motion of a bubble can be sensed or the changes in the acoustic energy sensed. Anyone or more of these sensed characteristics can be used in the feedback.

In a preferred form of the invention the liquid is sealed in the container prior to the formation of a gaseous bubble in the liquid. The liquid is preferably degassed and the container is sealed against the ingress or egress of fluid, namely liquid and/or gas.

One form of creating the bubble in the liquid is applying heat energy to a selected area in the liquid thereby to develop a cavity or gaseous bubble in the liquid. The bubble is subjected to the acoustic energy thereby to locate the bubble under the action of the resonating acoustic energy at a selected location in the body of a liquid.

In a preferred form of the invention the acoustic energy applied to the gaseous bubble and the liquid is at a pressure sufficient to generate an imploding shock wave. Such an imploding shock wave travels towards its focal point, and during such travel heats the gas in the bubble. Reflecting from the focal point the gas is further heated to a temperature greater than about $10^{4°}$ K., and preferably greater than $10^{8°}$ K. in an area adjacent to the focal point of the spherical shock wave.

In those forms of the invention where the gas contains deuterium and tritium, the different energy form can include the generation of a fusion energy, namely including generation of a predetermined number of neutrons per second.

In those forms of the invention where the different energy form is light, the light energy, namely sonoluminescence has a repetition rate substantially equivalent to the frequency of the acoustic energy imparted to the liquid. Such frequency, is preferably between about 100,000 cycles per second and 1,000 cycles per second. It is preferably about 35,000 cycles per second. The pulse width of the sonoluminescence light energy is less than about 100 picoseconds, and the peak power is about 100 milliwatts. The spectrum is between 200 nanometers to 700 nanometers.

In a preferred form of the invention the ambient radius of the bubble after emitting light energy is less than about 5 microns, and preferably less than 2 microns on average. Prior to emitting light the maximum radius is greater than about 10 microns, and more preferably about 50 microns.

The radiation pressure of a resonant sound field in a liquid traps a small gas bubble at a velocity node. At a sufficiently high sound intensity the pulsations of the bubble are large enough to prevent its contents from dissolving in the surrounding liquid. For an air bubble in water, a still further increase in intensity causes these pulsations to become so enormous and nonlinear that the supersonic inward collapse of the bubble concentrates the acoustic energy by over twelve orders of magnitude so as to emit picosecond flashes of broadband light which extend well into the ultraviolet and which furthermore are synchronous with the sound field to picosecond accuracy.

The liquid can be cooled to increase the output of the different energy form. Thus cooling from about 40° C., to 1° C. increases the output about 200 fold. Cooling also decreases the size of the bubble, and increasing the ratio of maximum radius relative to the ambient radius. This is consistent with increased light output, namely a larger value for this ratio and with a smaller ambient radius the greater will be the output of the different energy form, namely light. Also as the ratio increases the larger is the imploding shock wave.

Many other aspects of the invention are now described with reference to the accompanying drawings.

III DRAWINGS

FIG. 1 is a graphical representation illustrating the spectrum of spectral radiance against wavelength.

FIGS. 2A and 2B indicate values of the intensity of sonoluminescence, sound field level $P_a$, maximum bubble radius $R_m$ and ambient radius $R_0$ as a function of water temperature for a trapped bubble of air. The number N of photons per burst with wavelength greater than 200 nanometers is measured in each case near the maximum achievable value. The bars are the ranges of intensities calculated from the shock wave theory when the uncertainty in the experimental input parameters is allowed for.

Figure 5:
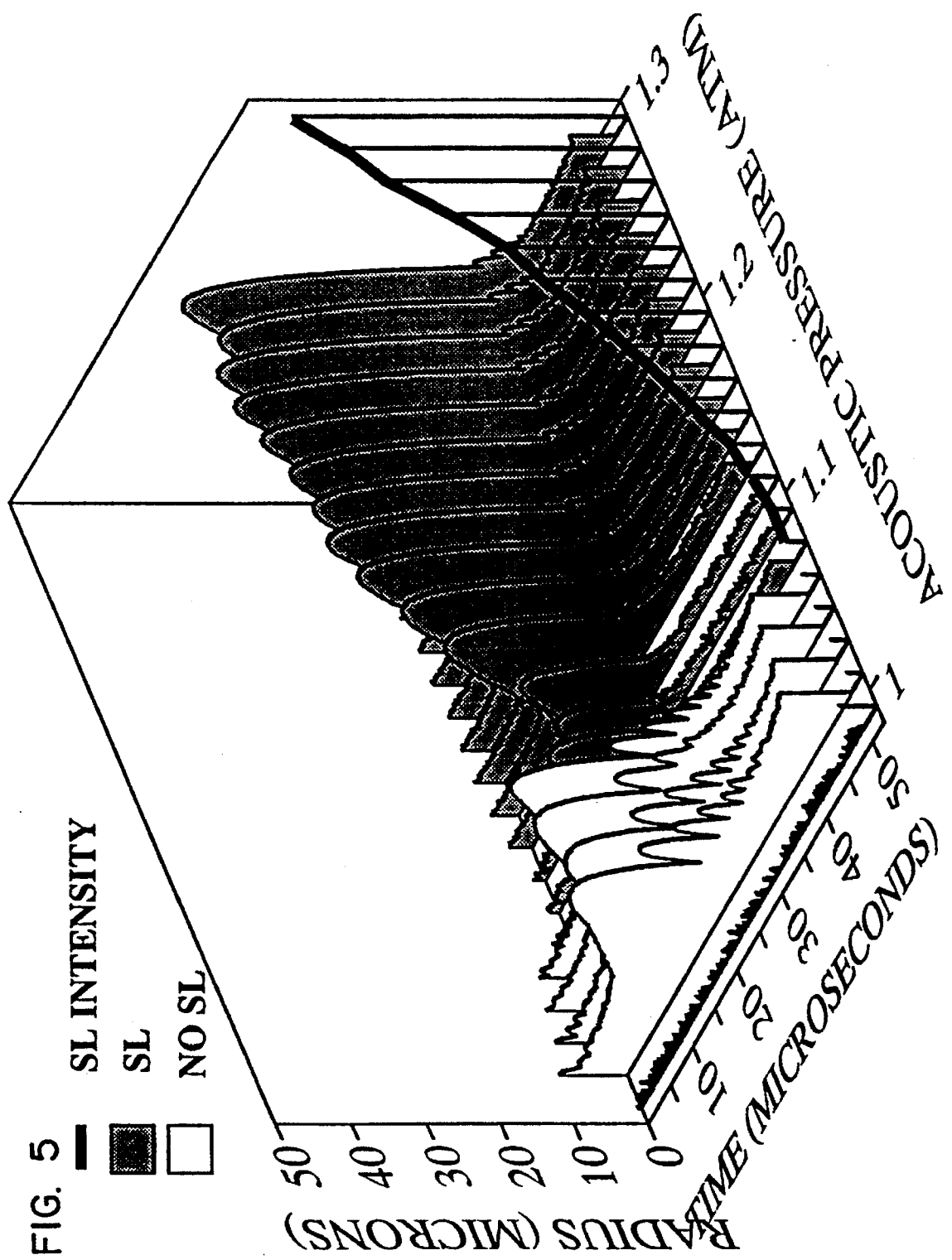

FIG. 5 shows bubble radius versus time for about one cycle of the imposed sound field as a function of increasing drive level. The shaded area represents the light emitting region. The relative intensity of emitted light as a function of drive level is indicated by the solid line ramp. For the unshaded region, the bubble is trapped but no light is emitted. At drive levels below the unshaded region the bubble dissolves over a long time (~1 sec). The lowest amplitude sweep (no bubble present) indicates the noise level.

Figure 6:
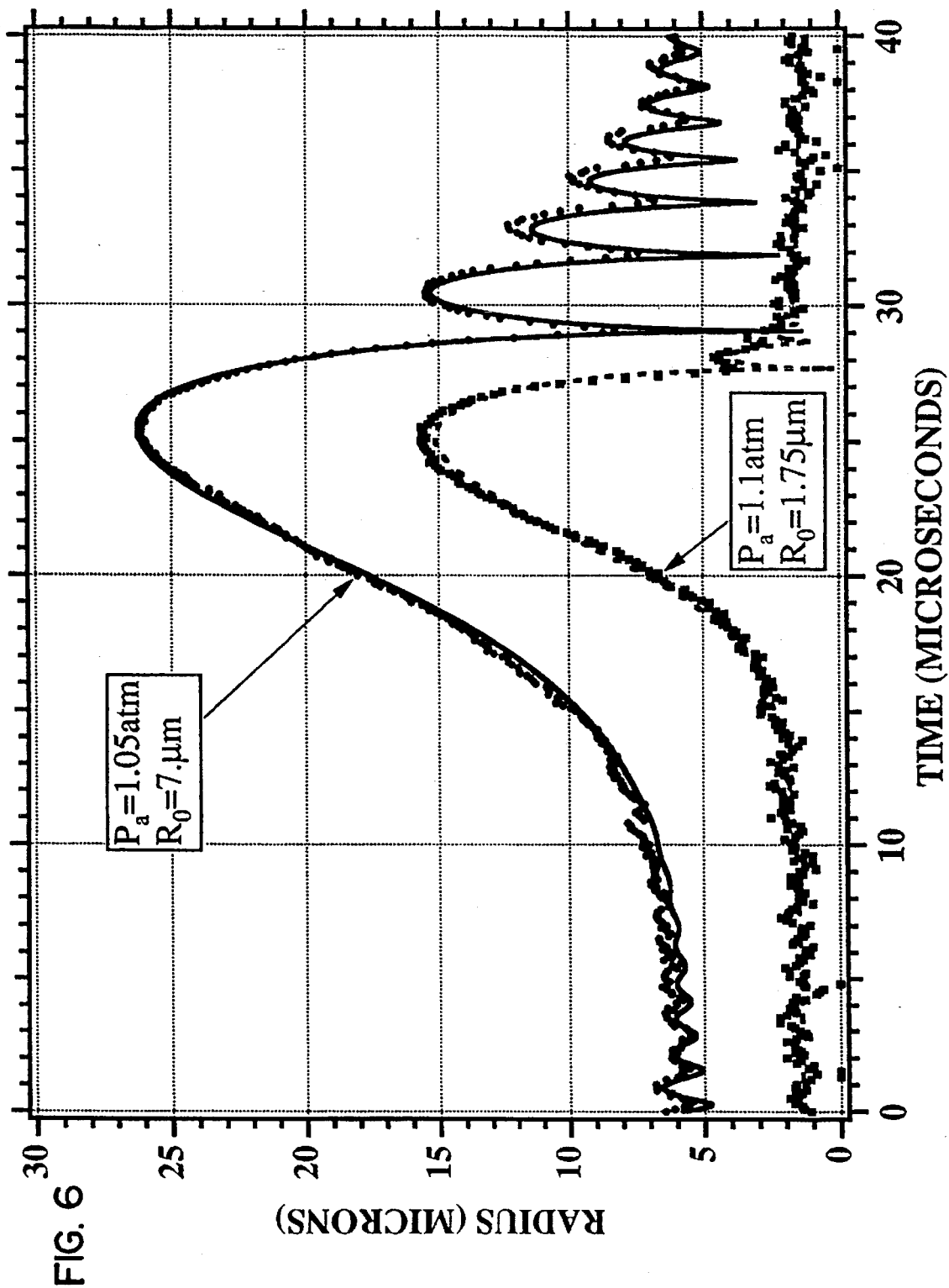

FIG. 6 shows a plot of radius versus time for bubble motion must above and below the threshold for the onset of sonoluminescence. The data has been matched to the Rayleigh-Plesset equation using the procedure discussed references 3 and 9. The frequency of the resonant sound field is 26.4 kHz and its quality factor is about 1000.

Figure 7B:
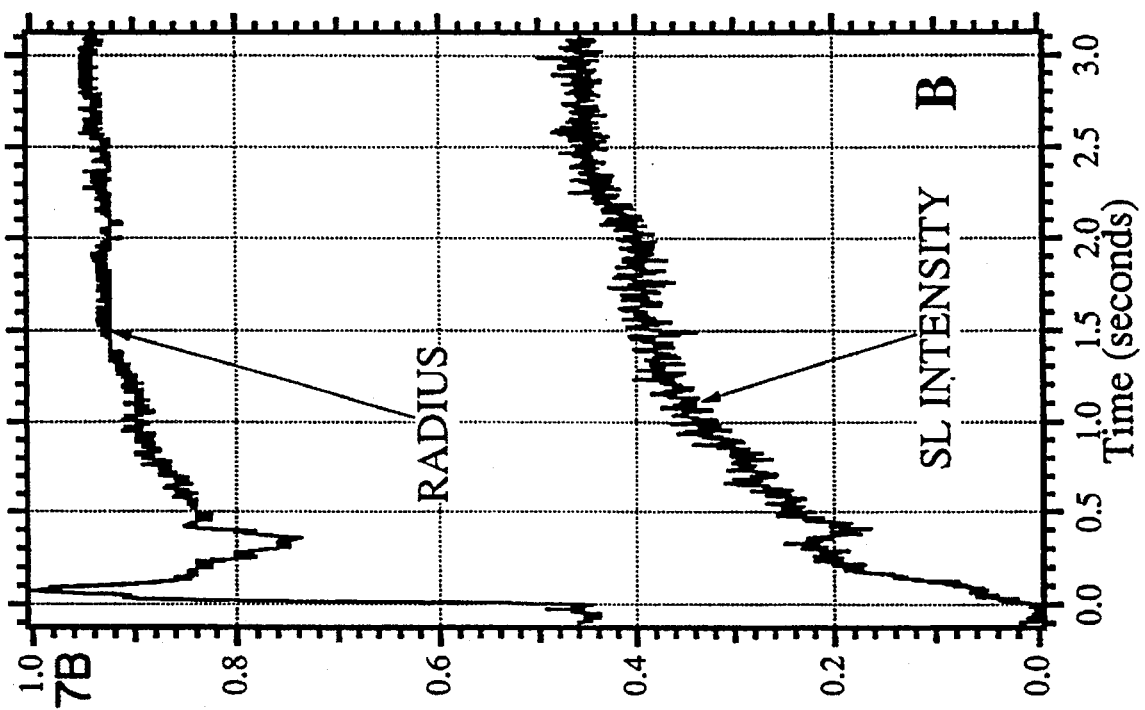
Figure 7A:
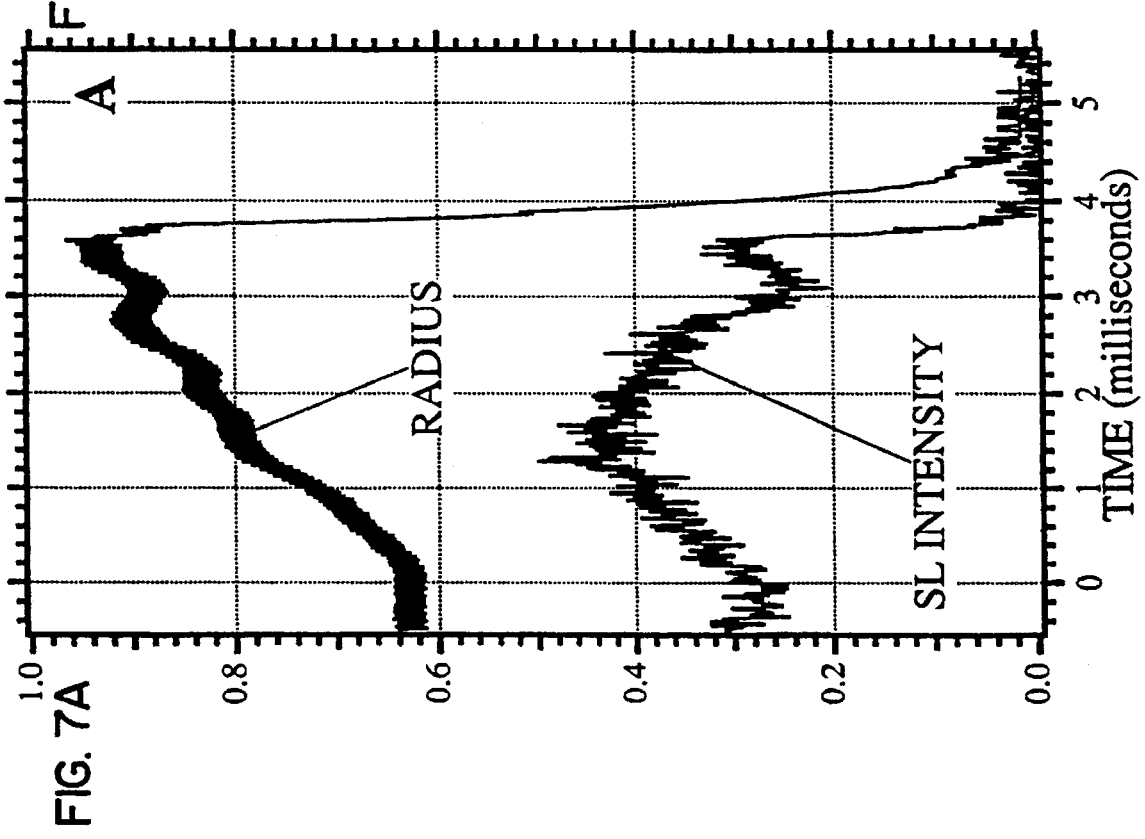

FIGS. 7A and 7B show the dynamic response of the intensity of sonoluminescence and of the maximum bubble radius to a sudden change in drive level. In FIG. 7A, the drive is boosted above the upper threshold and, after becoming brighter for a short time, the bubble disappears. In FIG. 7B, the drive is boosted from weak to strong sonoluminescence. After 'gagging', which can also be seen in FIG. 7A, the bubble achieves a new steady state during a long time scale measured in seconds. The signal has been averaged with a time constant of 100 µs for A and 10 ms for FIG. 7B. Strictly speaking the results labeled 'radius' signal are proportional to the product of $R_m$ and the duration of the expansion.

Figure 8:
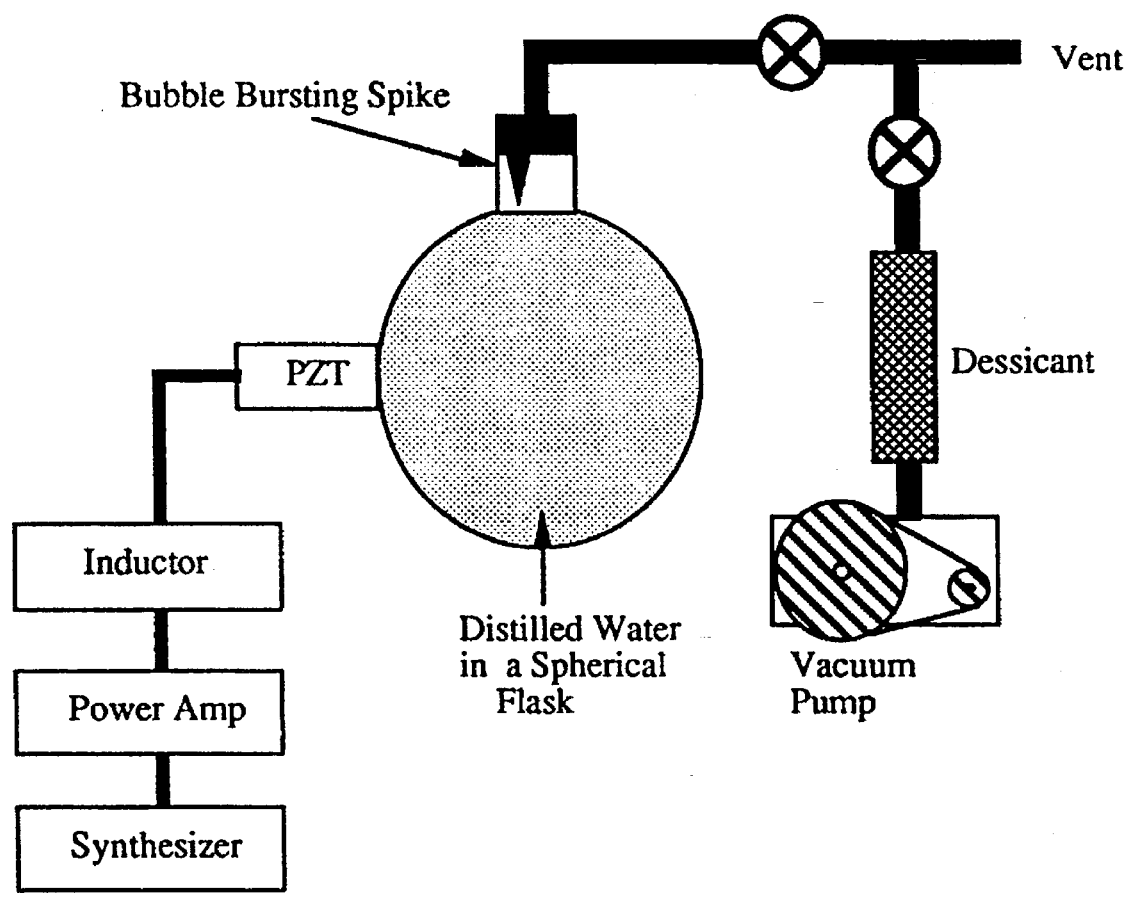

FIG. 8 is a block diagram showing a set-up used to degas water from an SL cell.

Figure 9A:
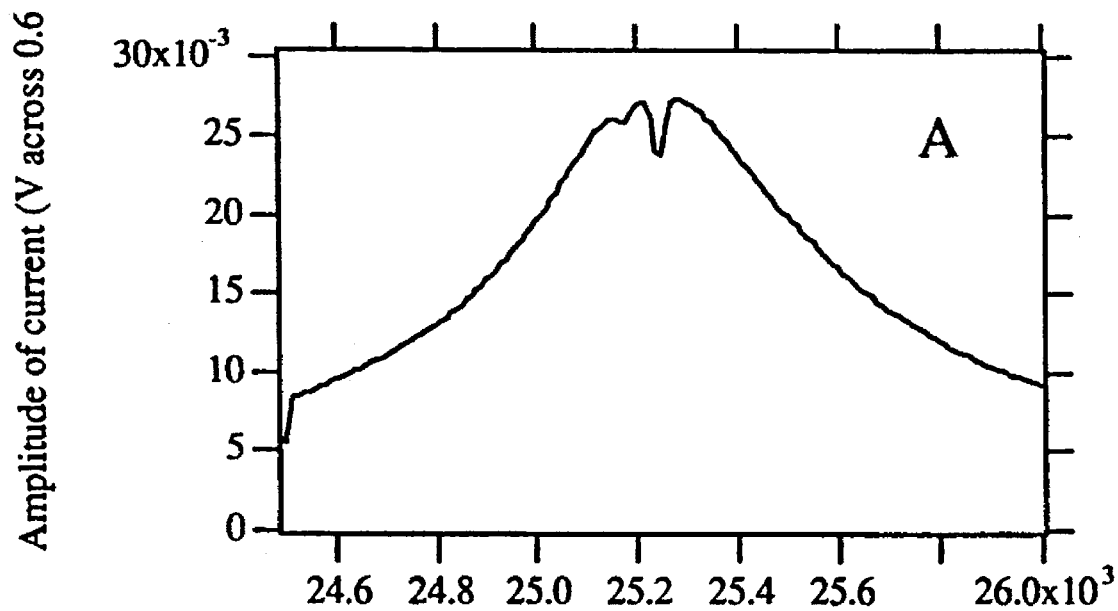
Figure 9B:
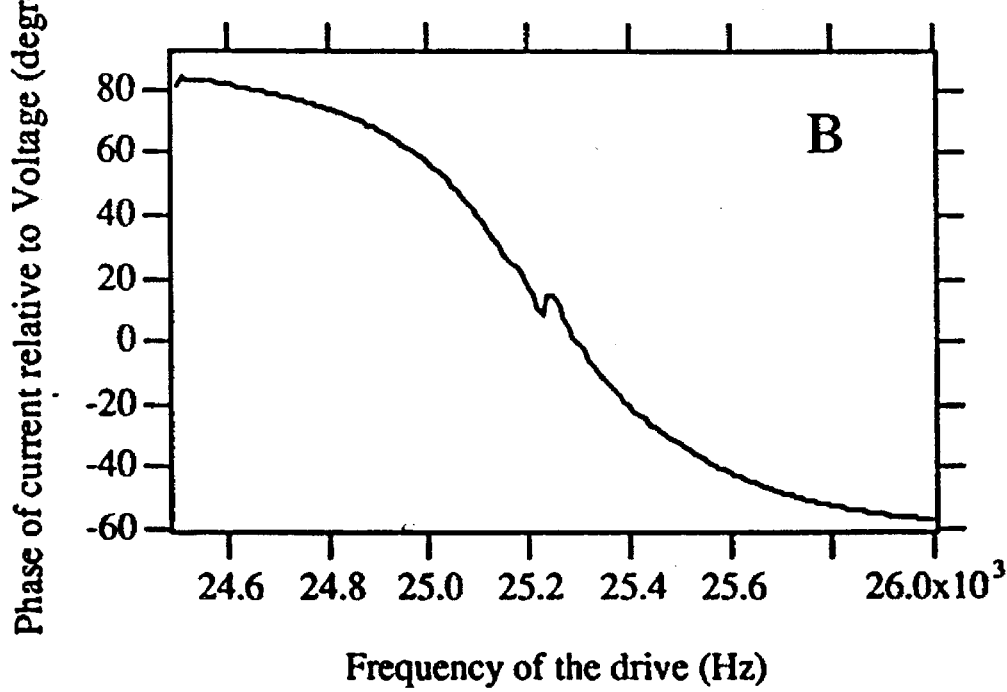

FIGS. 9A and 9B are graphical representations illustrating the characteristics of the drive circuit at the acoustic resonance. The resonance is located at the dip in the amplitude and the "glitch" in the current.

Figure 10:
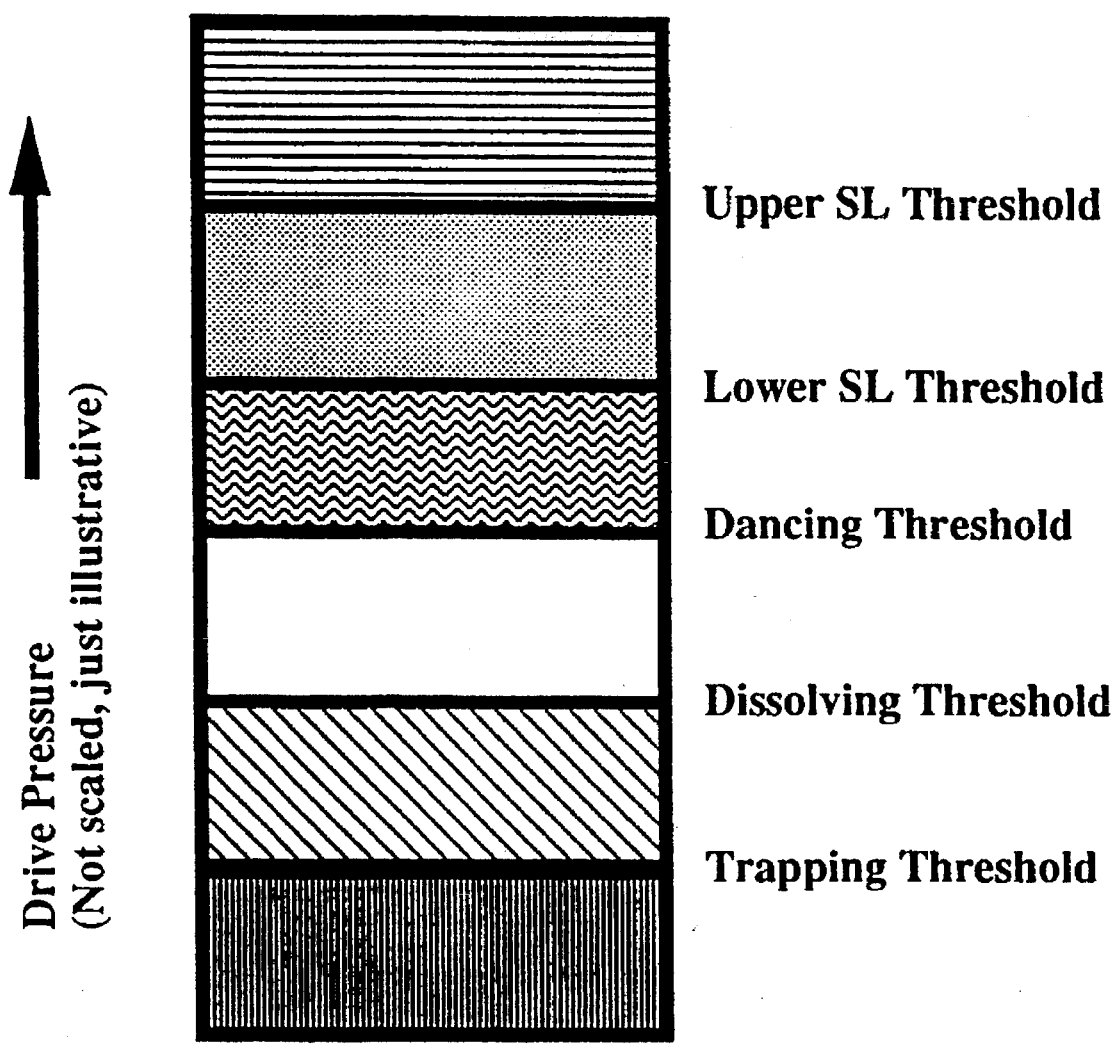

FIG. 10 is an illustration of the drive level thresholds between different types of bubble motion.

Figure 11:
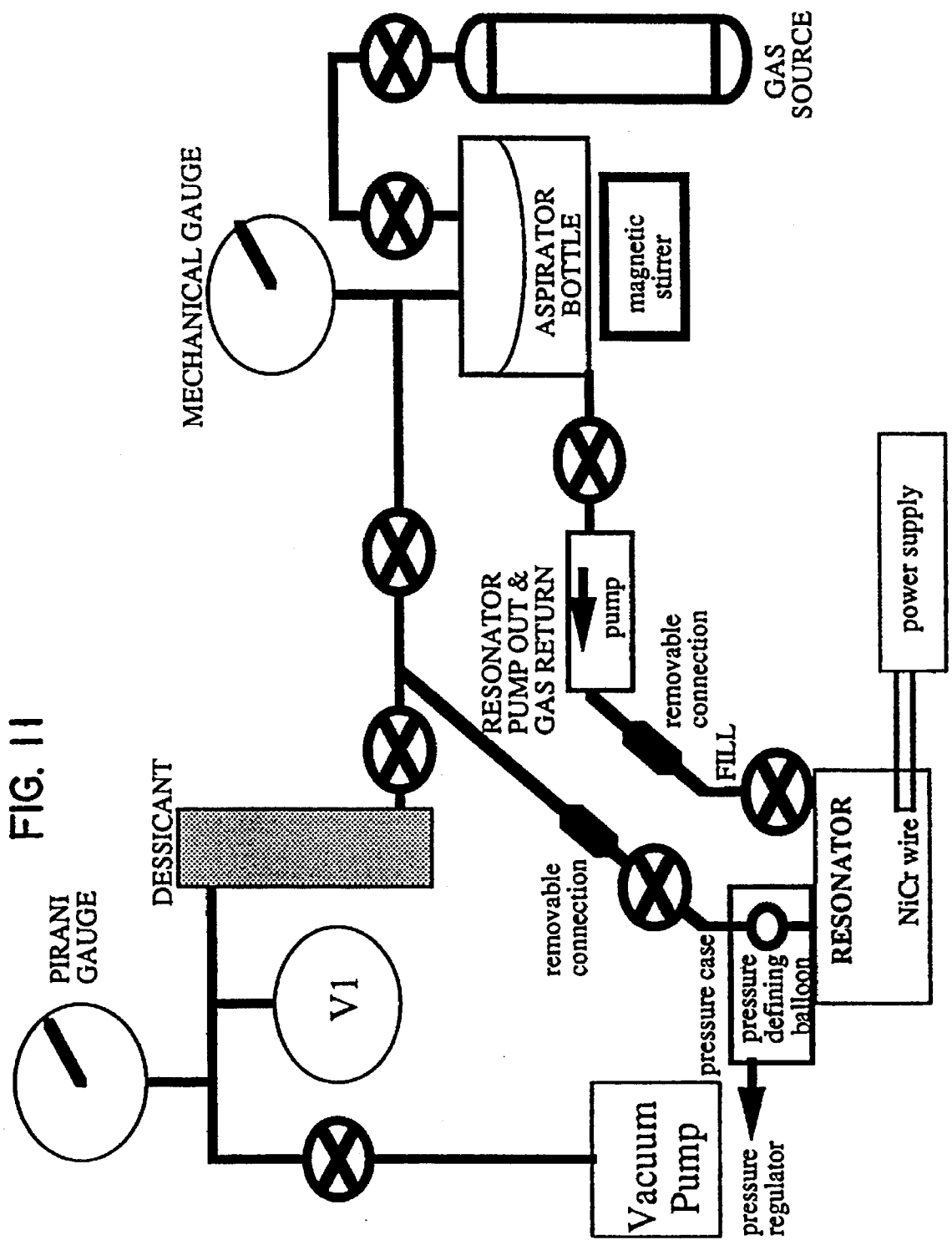

FIG. 11 is a schematic block diagram illustrating a system for preparing liquid to a known concentration of dissolved gas, transferring that fluid to an acoustic resonator and sealing that resonator against egress of fluid or contamination with atmospheric air. Further this shows a method to control the static pressure in the resonator.

Figure 12:
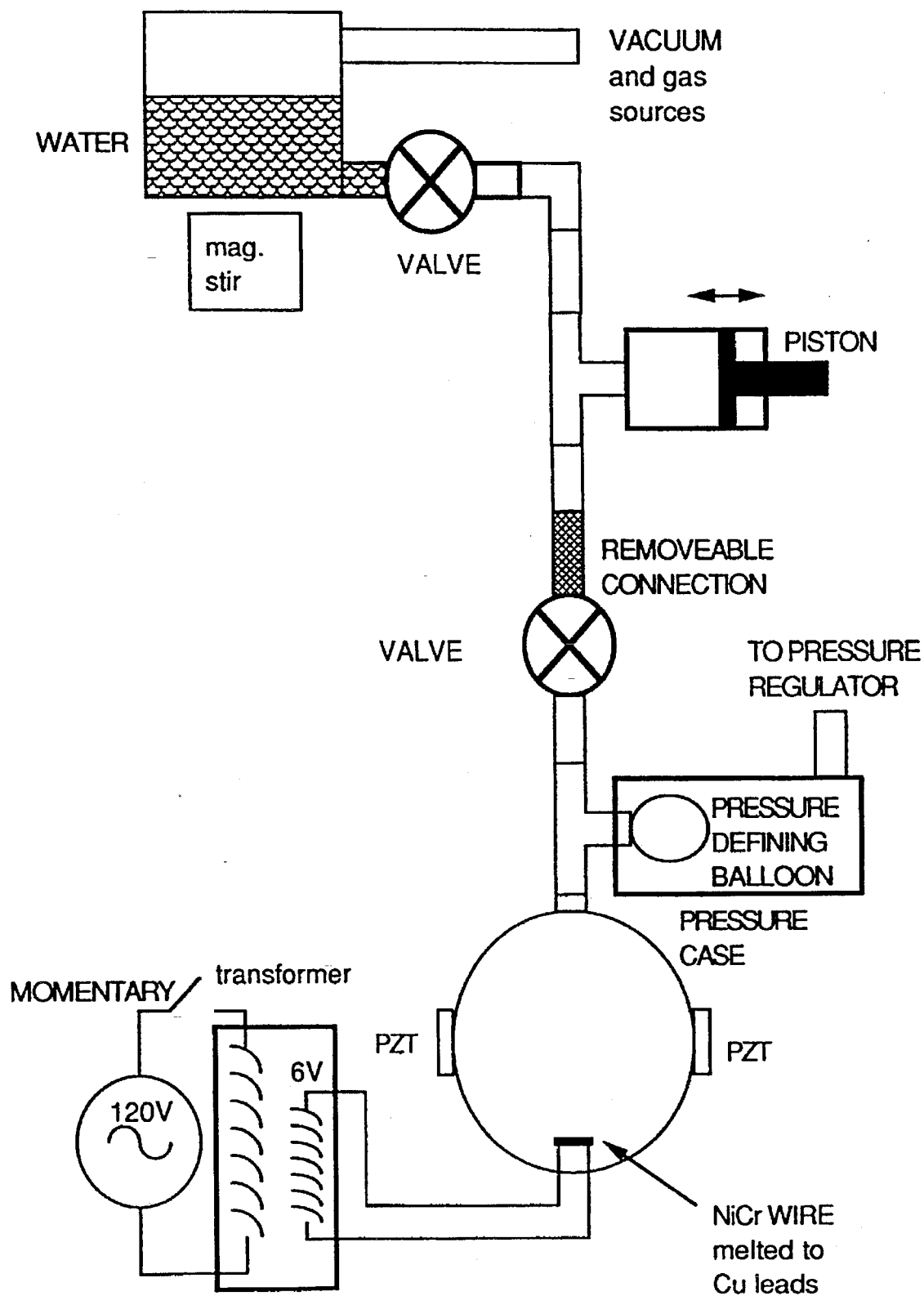

FIG. 12 is a schematic block diagram illustrating a cell for generating SL and for sealing the system with liquid. The filling apparatus is shown together with a system for generating a bubble.

Figure 13:
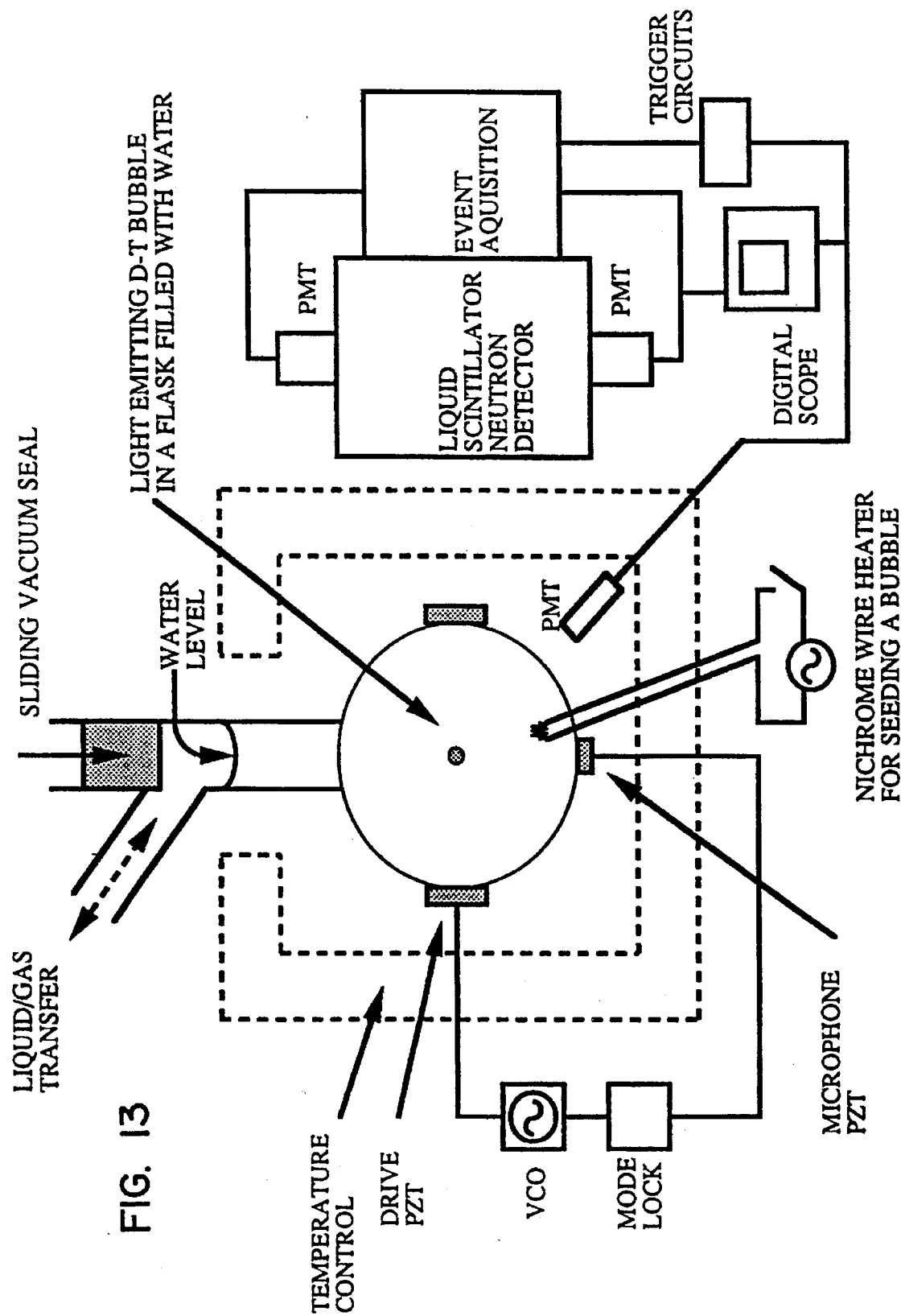

FIG. 13 is a block diagram of experimental search for neutron emission from sonoluminescence in a D-T bubble.

Figure 14:
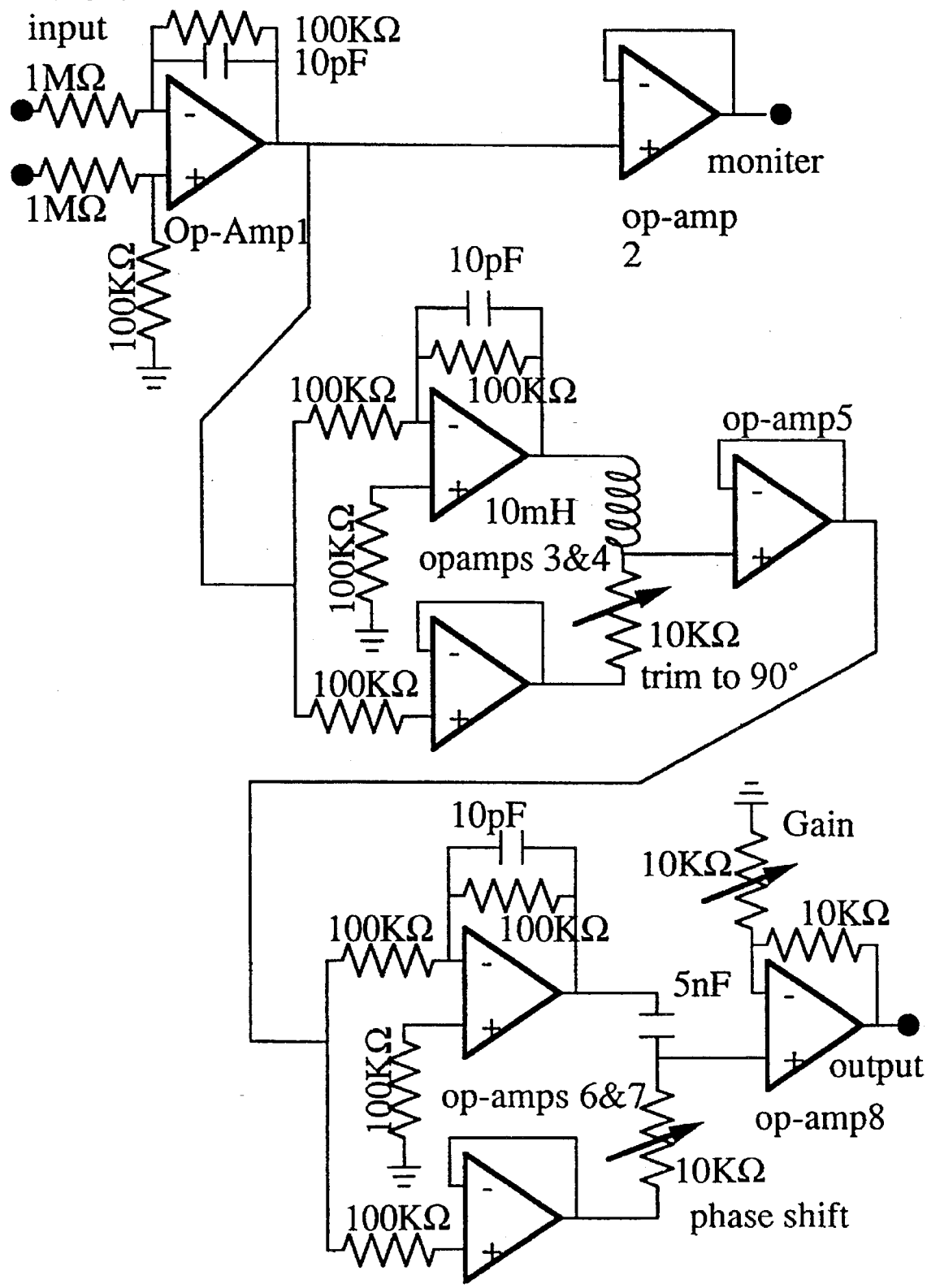
Figure 22:
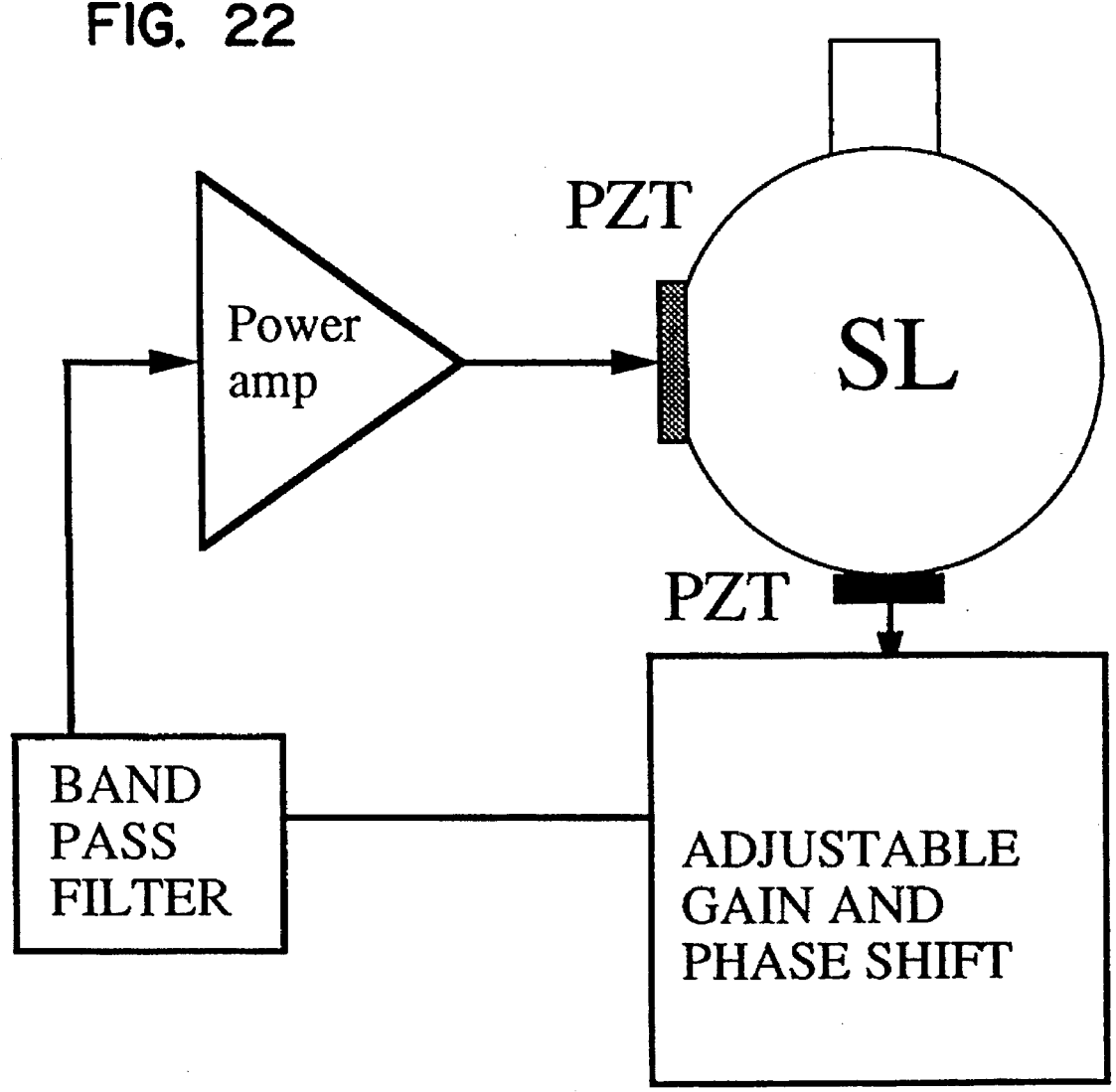

FIG. 14 is a schematic illustrating the phase shift of the self-starting circuit as illustrated in FIG. 22.

Figure 15:
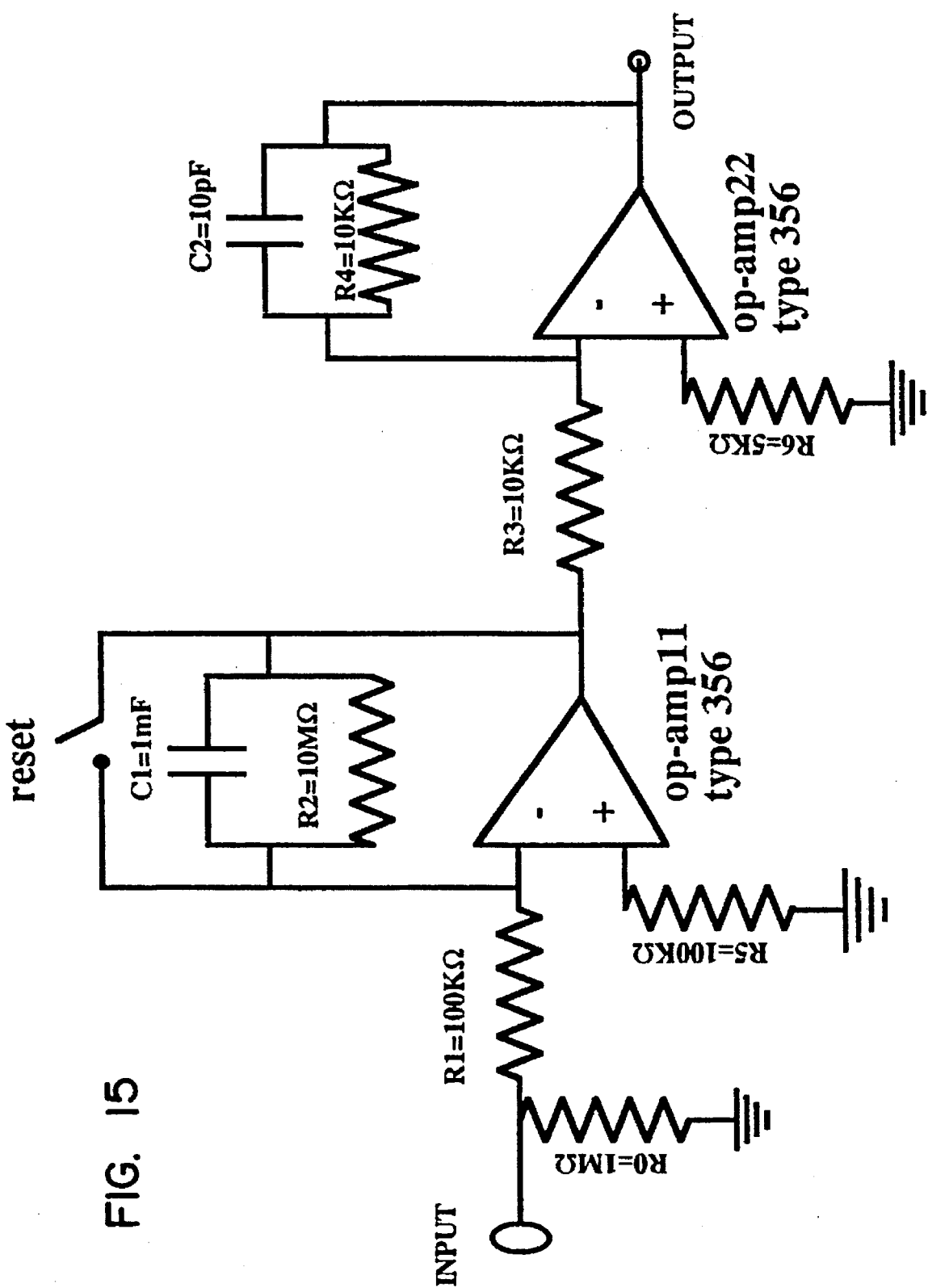
Figure 23:
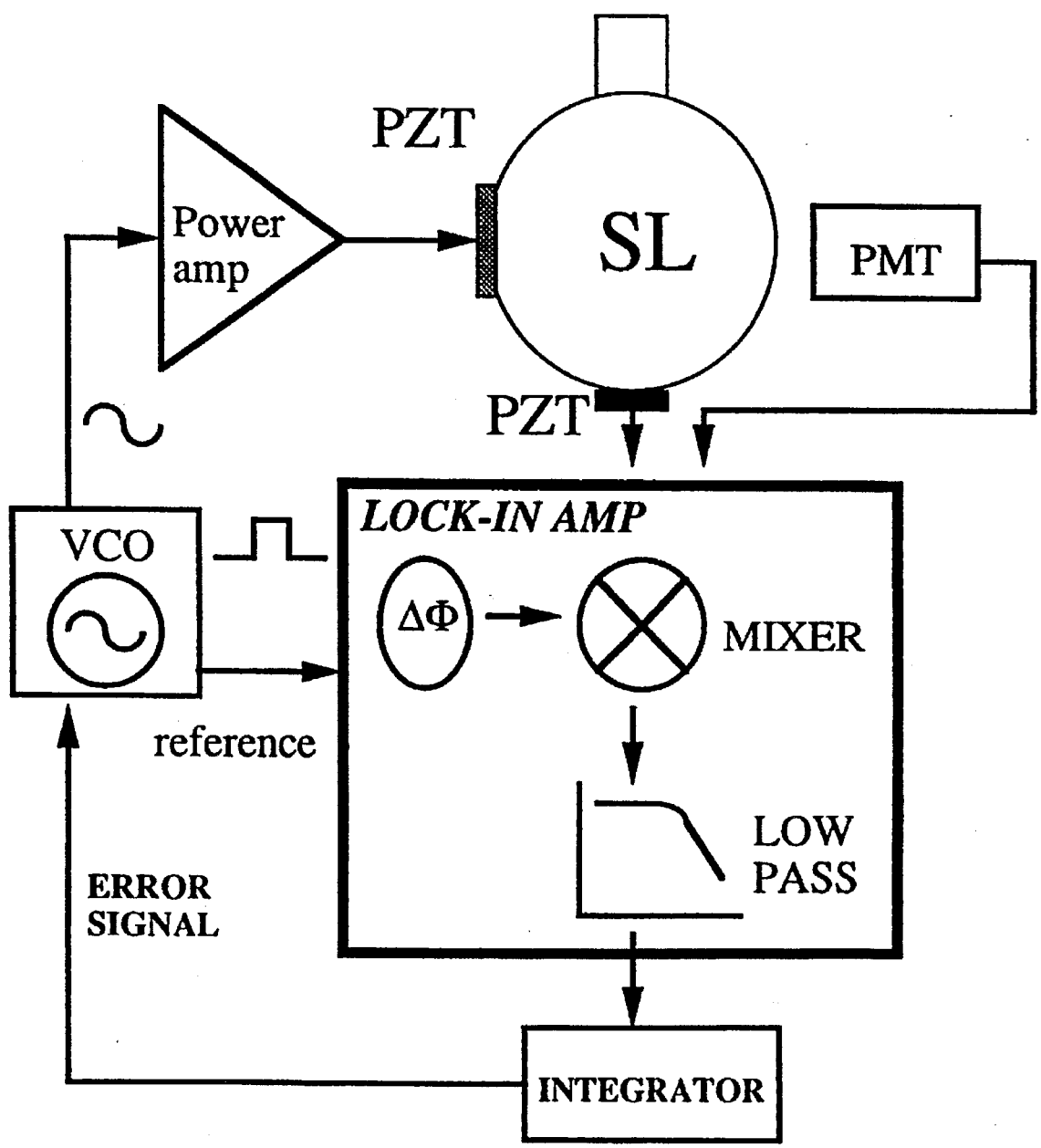

FIG. 15 is a schematic illustrating the integrator for use in the phase locking circuit illustrated in FIG. 23.

Figure 16:
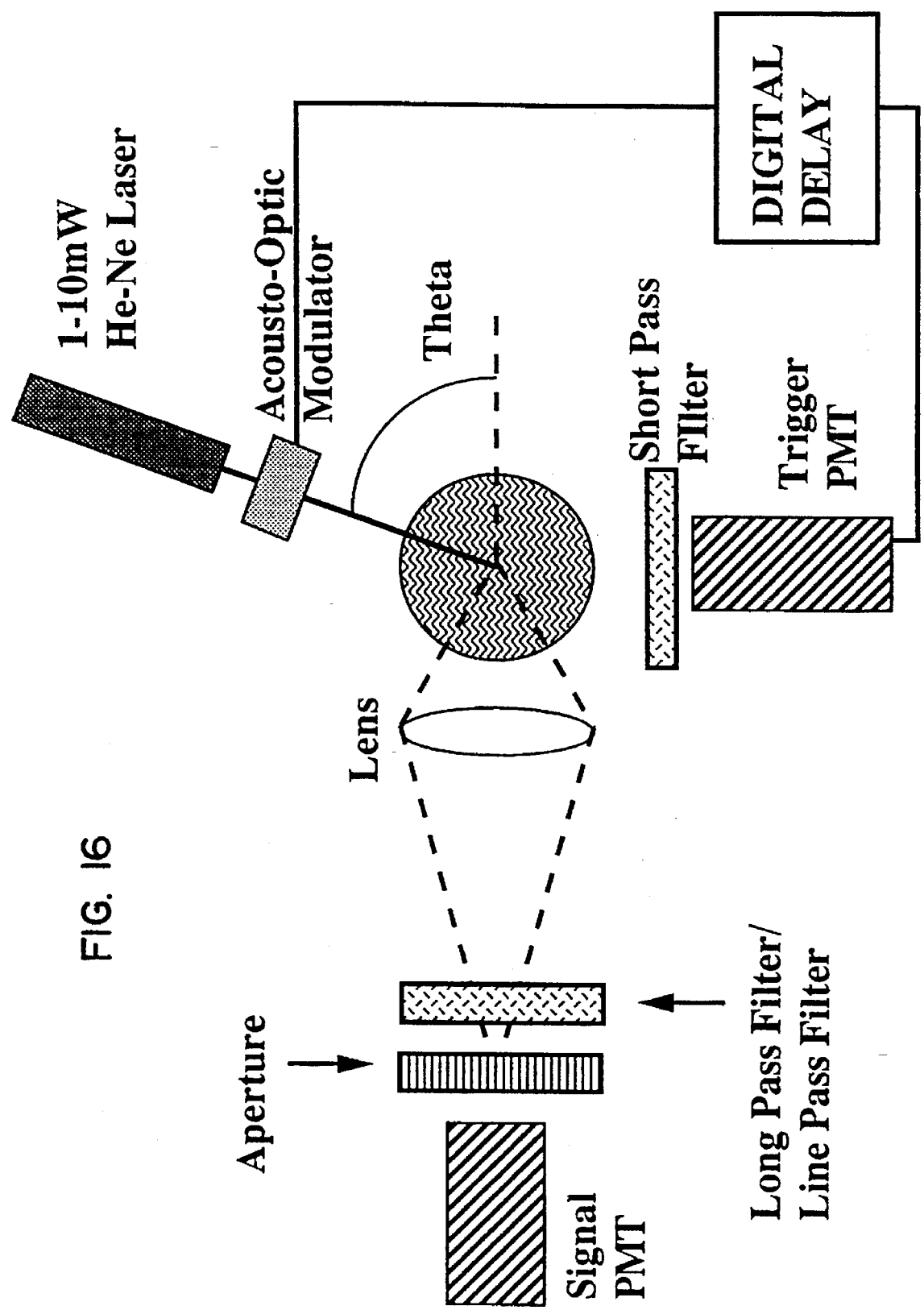

FIG. 16 is a schematic illustrating the arrangement of an SL cell in relation to a laser for performing laser scattering experiments.

Figure 17:
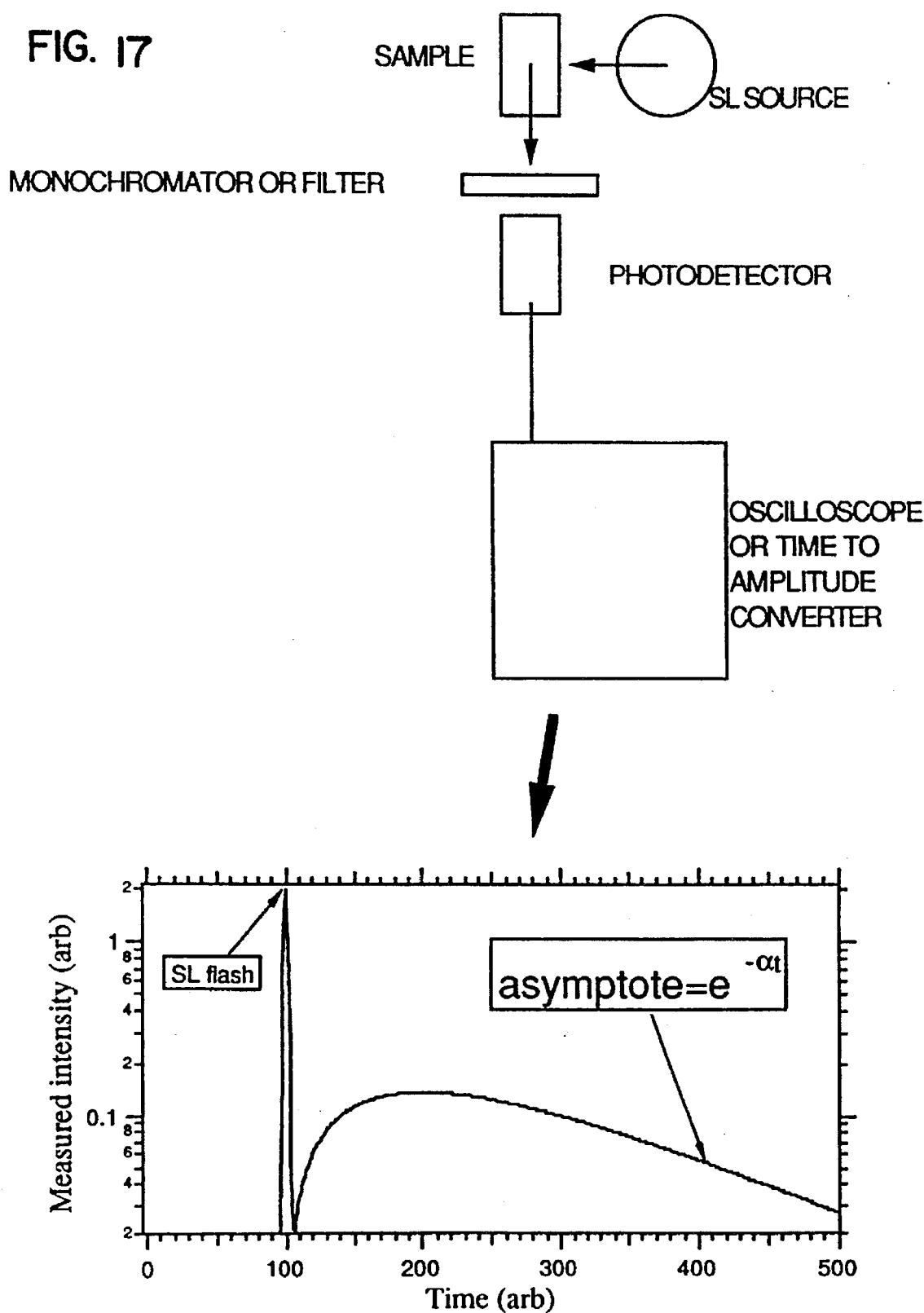

FIG. 17 is a block diagram representation of the application of the SL source in relation to the measurement of a fluorescence response in a sample.

Figure 18:
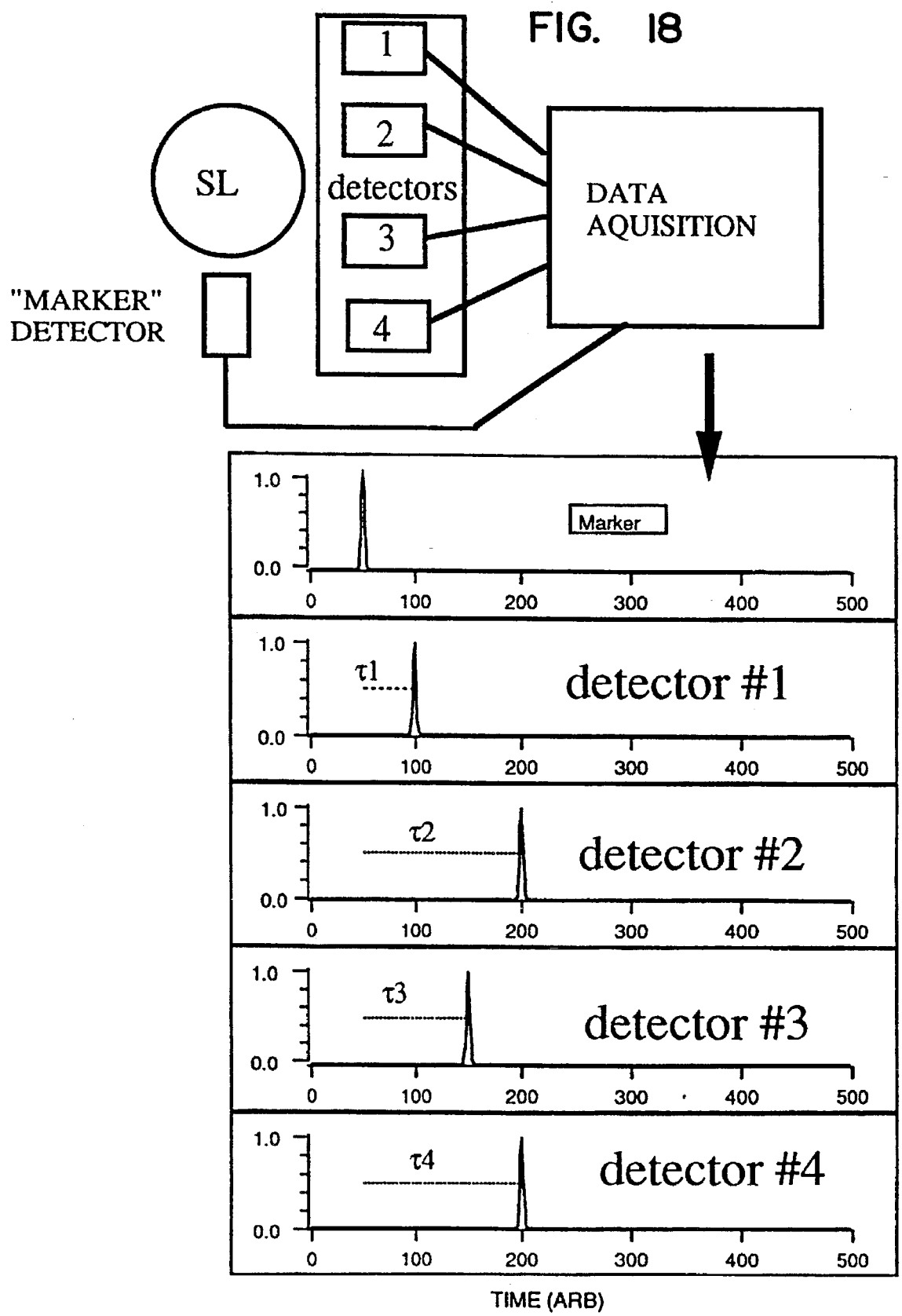

FIG. 18 is a block diagram representation of the relation of an SL source in relation to various detectors for detector calibration.

Figure 19:
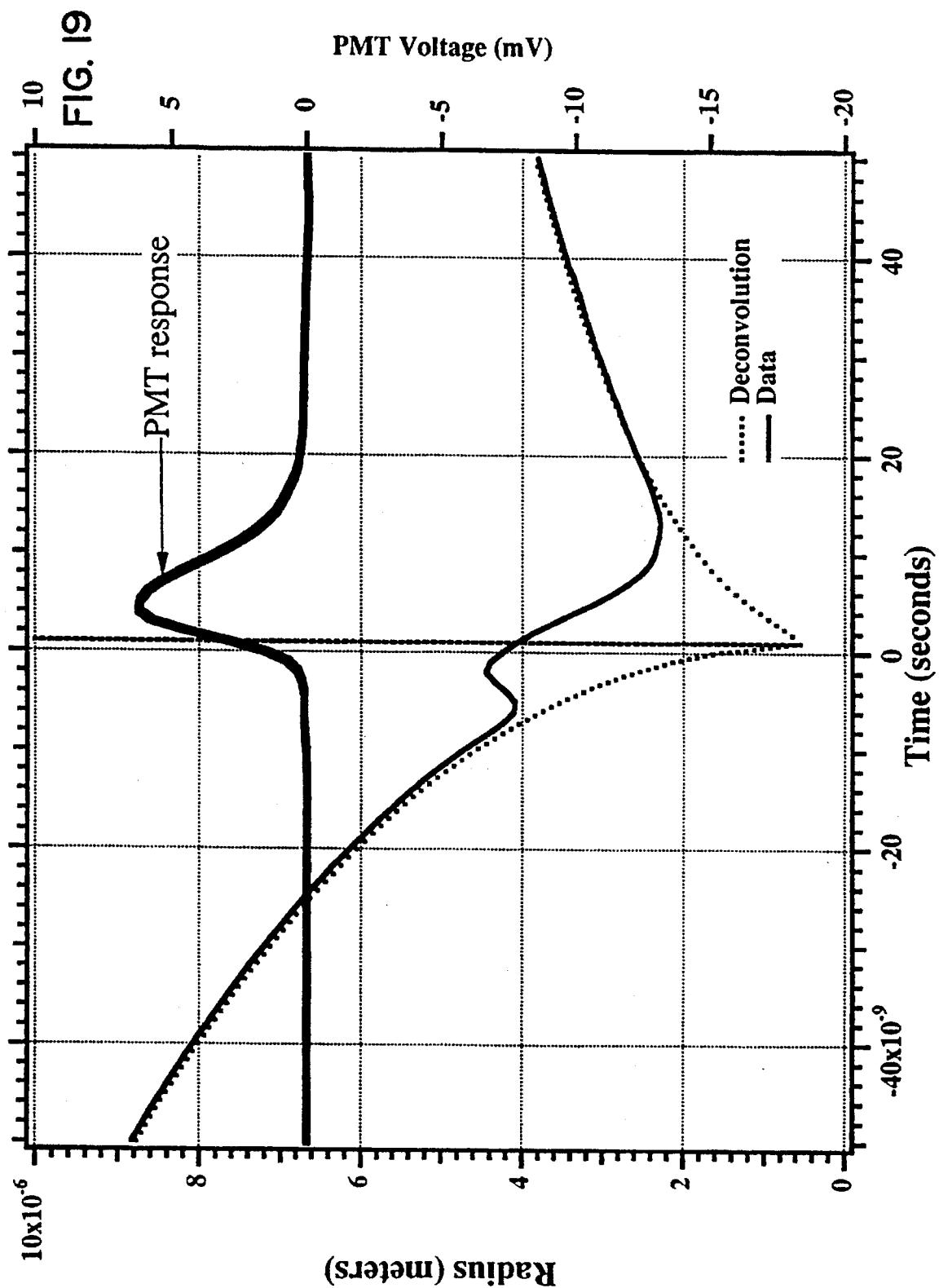

FIG. 19 is a light scattering measurement of bubble radius as a function of time near the moment of collapse. The solid line is the experimental data and the dash line is the deconvolution of this data for the given PMT response. The bump near the minimum is due to the SL flash.

Figure 20:
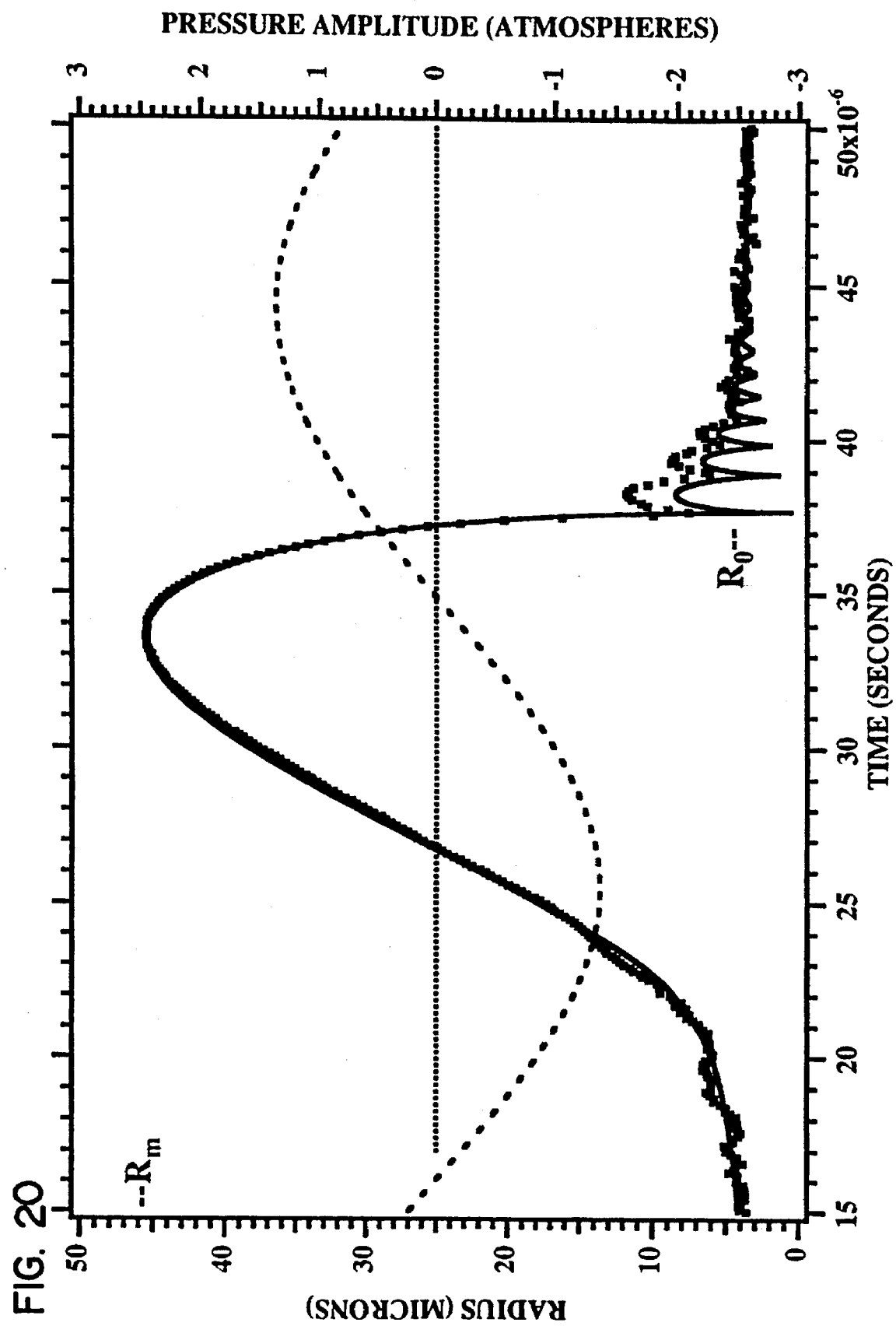

FIG. 20 is a representation of the radius of an air bubble in water as a function of time for once cycle of the driving sound field. The dots are experimental data obtained by light scattering from a sonoluminescence bubble. The solid line is a solution to the Rayleigh-Plesset for bubble motion for a pressure swing of $P_a=1.35$ Atmospheres and a frequency of $\omega_a=2\pi$ (26.5 kHz). The ambient radius are $R_0=4.5$ microns corresponding to the bubble size when the driving sound amplitude, shown by the dashed line, passes through the first node. In response to the rare faction phase of the sound field the bubble grows to a maximum size $R_M$.

Figure 21:
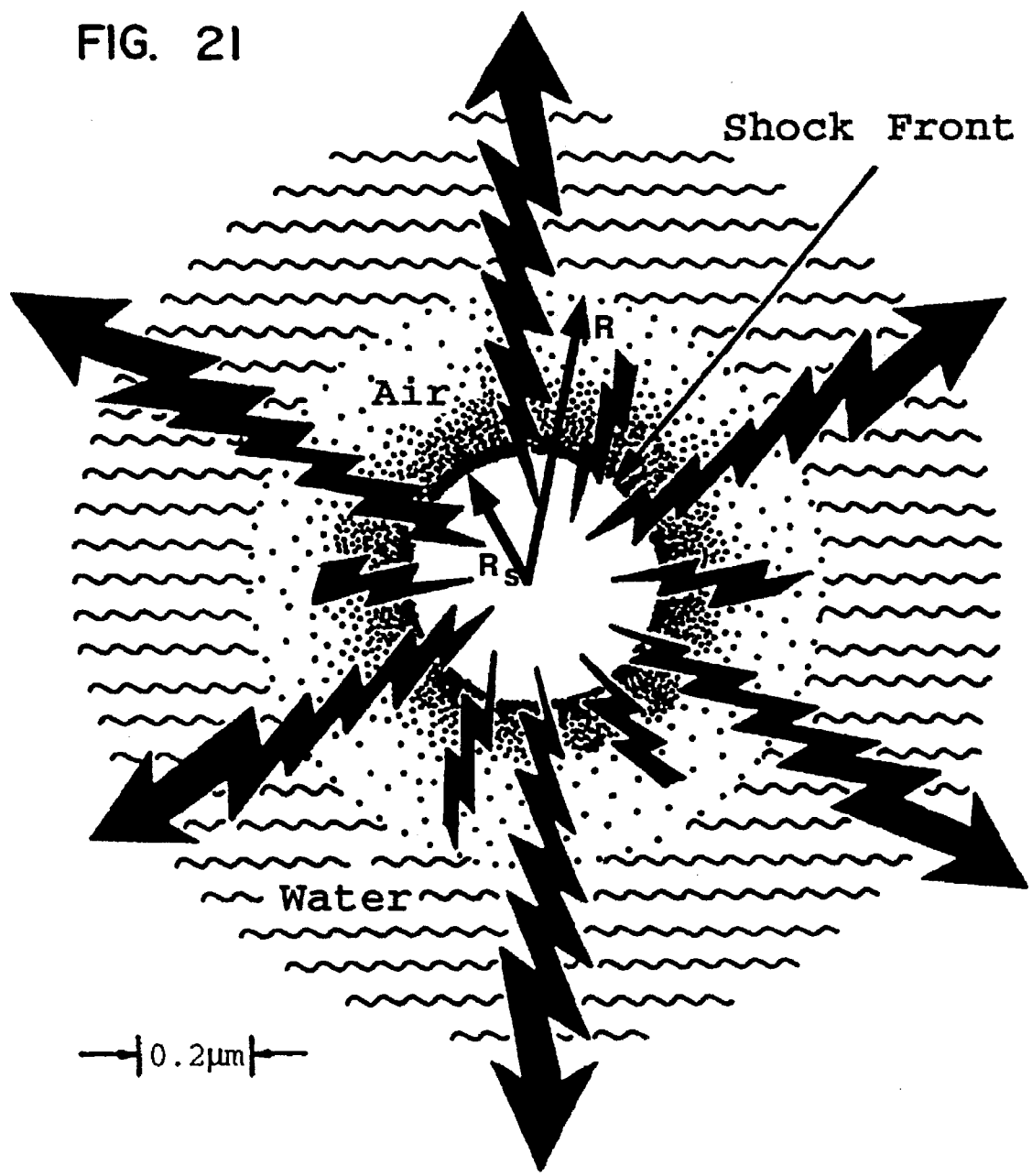

FIG. 21 is a representation of an imploding shock wave model of SL. The radius of the gas-water interface is R and the radius of the shock front is $R_S$. The shock first implodes to a focus and then explodes. This figure represents the stage reached about 100 ps after focusing.

FIG. 22 is a schematic of a self-starting system for a SL cell.

FIG. 23 is a schematic illustrating a phase-locked loop system for operating an SL cell.

IV DESCRIPTION

IV.1 Sonoluminescence

Sonoluminescence (SL) is a far off equilibrium phenomenon in which the energy in a sound wave spontaneously concentrates so as to generate flashes of light in a liquid.

From its discovery in 1934 up until the work of Crum and Gaitan, SL had been a transient and erratic effect. Bubbles would cavitate at random and unpredictable locations throughout the insonated fluid. As they collapsed they emitted flashes of light also in some unpredictable fashion. Crum and Gaitan observed SL from a single isolated cavitating bubble (Gaitan, F. and Crum, L. 1990: "Sonoluminescence from Single Bubbles," J. Acoust. Soc. Am. Suppl. 1, 87, S141/Gaitan, F. 1990: Ph.D. Thesis, National Center for Physical Acoustics, University of Mississippi).

IV.2 Energy Conversion, Concentration and Amplification of Sonoluminescence.

In the standard model for sonoluminescence, collapse of a bubble formed by cavitation occurs in a sufficiently spherical and adiabatic manner so the energy of collapse is delivered to a small number of molecules, which are thus excited or dissociated to the point at which they emit light (as chemiluminescence) when they recombine (Verrall, R. and Sehgal, C. 1987: "Sonoluminescence," Ultrasonics 25, 29–30). The phenomenon of SL involves an extraordinary degree of energy focusing. A typical SL sound field has a pressure swing P of 1 Atmosphere, which in water corresponds to a Mach number M of $10^{-5}$ (M=u/c where u is the speed of the fluid motion and c is the propagation speed of a sound wave). The energy density of the sound field is then:

$$U = \frac{1}{2} \rho(u)^2 = \frac{1}{2} \rho(Mc)^2 \equiv 17.3 \frac{erg}{cm^3} \equiv 1.08 \times 10^{-11} \frac{eV}{atom} \quad [1.2.1]$$

where $\rho$ is the liquid density and $$1 \ eV = 16 \times 10^{-19} \ J = 1.6 \times 10^{-12} \ erg$$

As a photon must originate from a molecule, ion or atom and as a blue photon has an energy of ~3 eV, this phenomenon involves a focusing or amplification of greater than 11 orders of magnitude (Barber, B., Löfstedt, R., and Putterman, S. 1991: "Sonoluminescence," J. Acoust. Soc. Am. 89, 1885, Barber, B. and Putterman, S. 1991: "Observation of synchronous picosecond sonoluminescence," Nature 352, 318–320.). The size of the spontaneous energy concentration, which characterizes SL, is extremely large. The limits of amplification achievable with this type of non-equilibrium phenomenon are unknown.

IV.3 THE PROPERTIES OF SL

Sonoluminescence involves the repetitive emission of light flashes one per cycle of the driving audible or ultrasonic sound field. The width of each flash is conservatively less than 100 picoseconds. Flashes containing more than 1 million photons are producible. By conservatively choosing the average photon to carry 3 eV (blue) then the lower limit on peak power is 10 mW.

This lower bound is increasing because as new ways to produce more photons are found, a large fraction of the SL emission is in the UV. This lower bound on peak power will increase if the SL flashes are narrower than 50 ps.

The flashes occur with a clock-like synchronicity; the jitter in time between consecutive flashes is less than 50 picoseconds. A valuable use for the pulse-to-pulse synchronicity is to generate a trigger connected to SL. No other trigger, which can be generated prior to the SL flash it is connected to, has a jitter of less than a nanosecond. An immediate application of the synchronicity is to provide the trigger for a streak camera to be used to measure the flash width.

Streak cameras can be used to measure the duration of a single flash, or many flashes can be overlaid using the camera's repetitive sampling mode. Using a streak camera it is possible to resolve pulse widths down to a few picoseconds. Using a Hamamatsu camera the duration of the 34 ps PLP-01 pulses were measured by taking advantage of the pulser's hard trigger to use the camera in its repetitive sampling mode.

Figure 1:
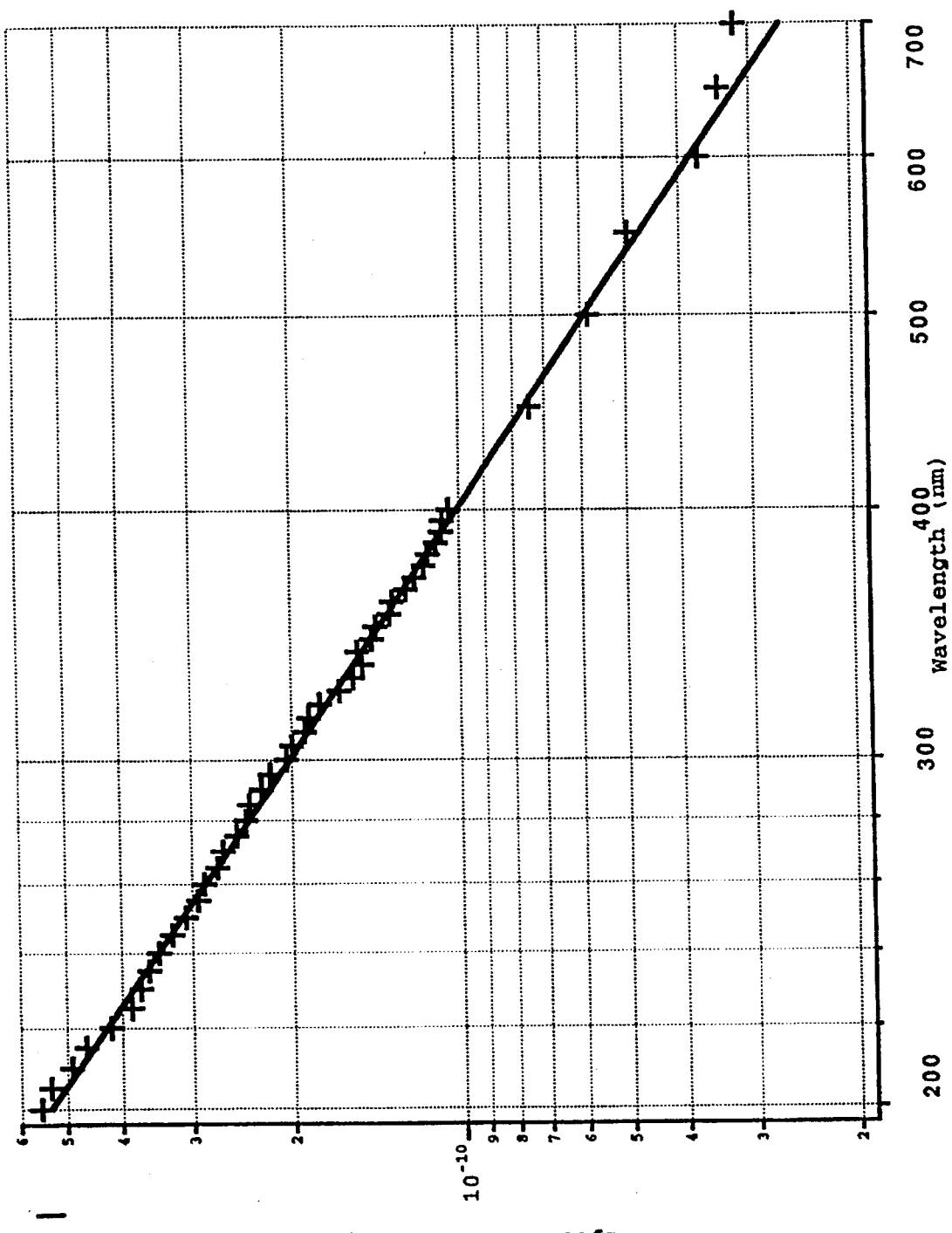

The spectrum of the SL light emission is broadband extending from 700 to 200 nanometers, the UV cutoff of water (FIG. 1.) The spectrum is increasing into the UV but because water does not transmit energy between 6 eV and 5 keV the peak in light emission is unknown.

Figure 3:
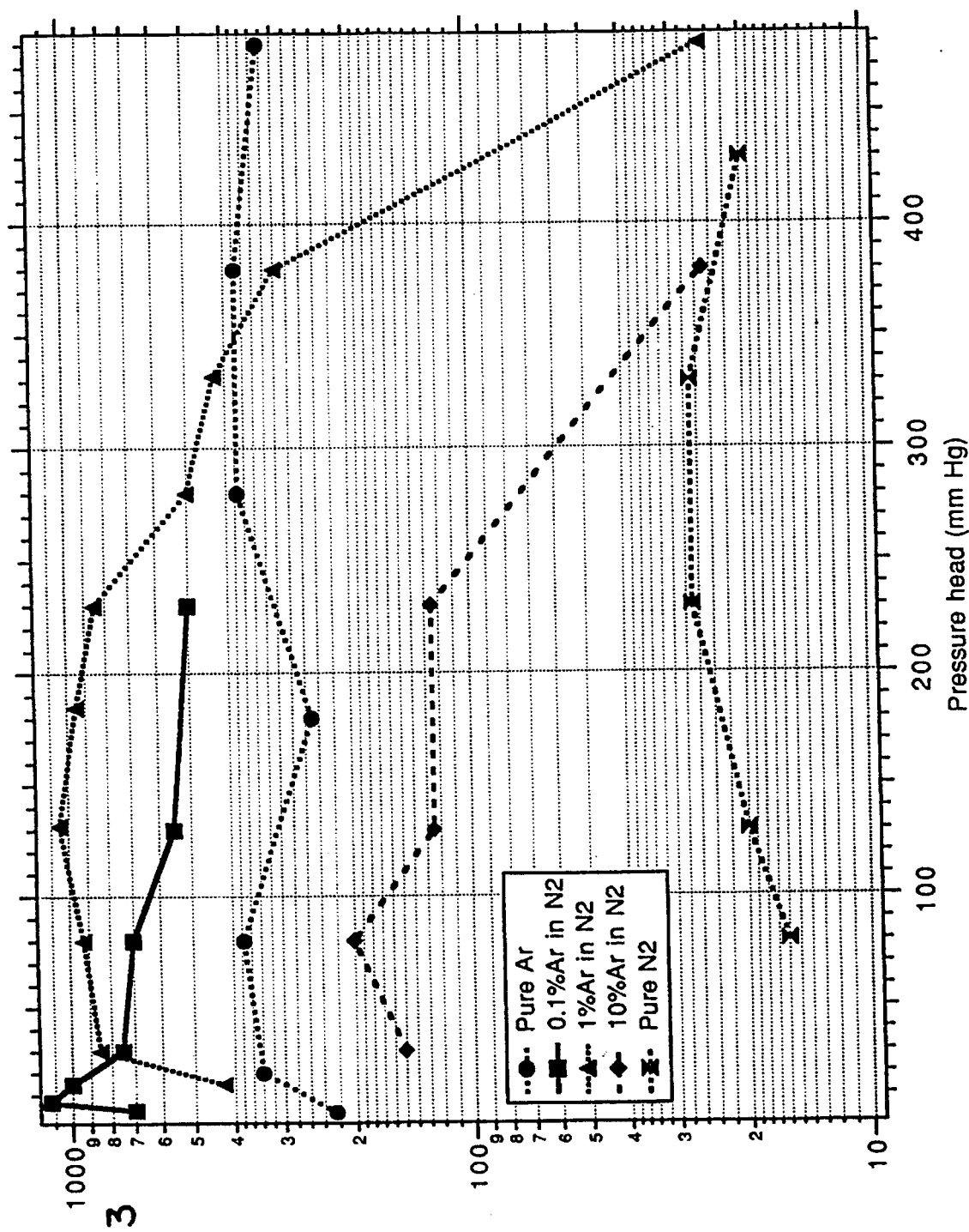
FIG. 3 is a graphical representation of the intensity of SL in relation to different degrees of saturation of different gases in a liquid. The gases are respectively pure argon, 10% argon and nitrogen, and 0.1% argon in nitrogen and pure nitrogen.
Figure 4:
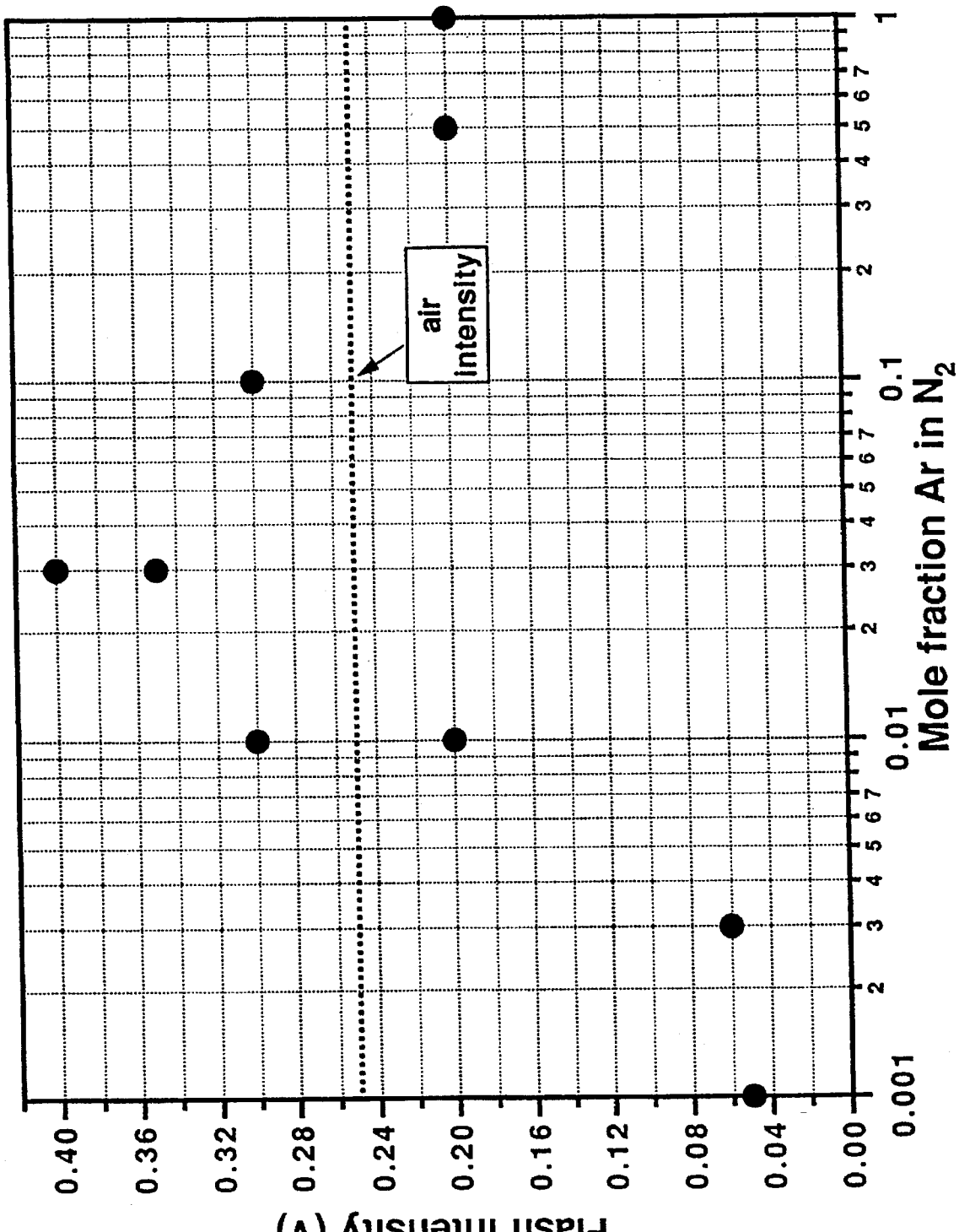
FIG. 4 is a graphical representation of the flash intensity of SL brightness in regard to the degree of doping of argon in nitrogen.

The light emission is spherically symmetric and of uniform intensity from flash to flash. The intensity is a sensitive function of experimental parameters. The intensity per flash increases with decreasing drive frequency. The extreme sensitivity of SL to external parameters, such as the water temperature and the sound field amplitude, is indicated in FIG. 2A. As the water temperature decreases from about 40° C. to 1° C., the intensity of the light emission increases by a factor of over 200. At 1° C. the purple light emitted by the bubble is so bright that it can be seen by the unaided eye even in the presence of external lighting. At about 40° C. the SL is barely visible even in a darkened room. The difference in the position of the $\Delta$ at about the 34° C. location to the position at the 1° C. location indicates this increase. The intensity is also a strong function of the various gasses dissolved in the fluid and the extent to which the fluid is degassed (FIGS. 3 & 4).

IV.4 BUBBLE DYNAMICS

The initial stages of energy focusing in SL involve the nonlinear oscillations of a gas bubble in the fluid. Acoustic radiation pressure traps the bubble at a pressure antinode of the driving sound field. There it oscillates in response to the compressions and rarefactions of the sound field. The bubble's oscillation maintains it against dissolution into the degassed fluid. When the drive pressure is sufficiently large the bubbles oscillation is so nonlinear that the supersonic collapse of the bubble launches an imploding shock wave into the gas.

Light-scattering measurements show that the transition to SL is characterized by a bifurcation in the dynamics of a trapped pulsating bubble. In the SL state changes in bubble radius of only 20% are associated with factors of 200 in the intensity of emitted light. This sensitivity of SL suggests that it originates from the kind of singular behavior that arises from the implosion of a shock wave.

Since an understanding of this remarkable sensitivity would provide insight into the as yet unexplained mechanism of light emission as well as providing a critical test of theoretical models, a recently described light scattering technique is employed to determine the corresponding temperature dependence of the parameters which characterize the highly nonlinear pulsations of the bubble. These include its maximum radius $R_m$, the dynamic acoustic pressure amplitude $P_a$ at the location of the bubble and the ambient radius $R_0$ when its contents are at 1 Atmosphere.

According to our results, which are shown in FIG. 2A, the more than hundredfold increase in light intensity is accompanied by changes of only 10%–20% in the key physical quantities that describe the motion of the trapped bubble of air. The location of the • at the different temperature positions indicates this change. FIG. 2B further describes the relationship of temperature, pressure and ambient radius.

Even when the fluid temperature is fixed the intensity of SL is a rapidly increasing function of $P_a$ until, as shown in FIG. 5, an upper threshold is reached. With the goal of understanding the dynamical effects that limit the extent to which sound can be converted into light, there is displayed in FIG. 5 the measurements of radius versus time for a trapped bubble as a function of a slowly increasing drive level. The increasing drive level is the increasing intensity or pressure applied by the acoustic energy on the liquid.

In FIG. 5 are the following regimes: (a) at the lowest amplitudes shown, the sound field can trap the bubble but the oscillations are not sufficiently violent to make light: this is depicted by the unshaded distributions, namely below about 1.05 Atmosphere acoustic pressure; (b) as the amplitude is increased the bubble abruptly becomes significantly smaller while the collapse ratio $R_m/R_0$ becomes significantly larger: This is indicated by the shaded distributions, namely immediately above the about 1.05 Atmosphere acoustic pressure; (c) a still further increase in amplitude leads to a more violent collapse and a stronger light emission until an upper threshold is reached. This is indicated by the increased difference in $R_M$ and $R_0$ as the pressure increased up to about 1.3 Atmosphere. Above the threshold at about 1.3 Atmosphere acoustic pressure, it is impossible to maintain a stable bubble of any radius. The data for FIG. 2A were taken at the top of the SL regime where the number N of photons per flash is nearly its maximum, namely at about the 1.3 Atmosphere pressure. Before the light emission the bubble maximum radius is about 50 microns, and after the emission the ambient radius is less than about 5 microns, and about 2 microns.

The actual creation, generation and establishment of the light emitting mechanism SL is also extremely sensitive to small changes in $P_a$. A detailed comparison of the radius versus time curves just above and just below the abrupt transition between the regimes (a) and (b) is shown in FIG. 6. It can be seen that, as the acoustic drive is increased by a few percent, the bubble adopts a new steady state with a significantly smaller ambient radius; also, the collapse, first studied by Rayleigh, becomes more violent, as is evidenced by a lessening of the afterbounces. The low drive side of the threshold is characterized by an easily noticeable jiggling or 'dancing' of the bubble's position through a few multiples of $R_m$, whereas on the SL side of the threshold the bubble is extremely stable.

With other liquids, such as low viscosity silicon oil, a bubble has been trapped in the non-SL regime. It is not possible to achieve the transition to SL as shown in FIG. 6. The creation of SL is sensitive to small parametric variations.

Although the threshold for establishing SL is sharp and well defined, the time required for the bubble to reach the SL steady state is very long, typically on the order of $10^5$ cycles of the imposed sound field.

Displayed in FIG. 7B is the response of a bubble to a sudden jump in the sound intensity which takes it from a state of low (or zero) SL to one of high SL. In this case the short term response is followed by a long time response on the scale of seconds during which the bubble seeks a steady state characteristic of a more violent collapse. One physical process with this long time scale is mass diffusion for which a typical time is $$t_d = \rho_g R^2 / D C_0.$$

where $\rho_g$ is the gas density, R is a typical bubble radius, $$D = 2. \times 10^{-9} \, m^2/s$$

is the coefficient of mass diffusion for air in water and $$C_0$$

is the saturated concentration of air in water in the close vicinity of the ambient bubble. Due to the possible importance of mass diffusion, the data for FIG. 2A were taken at similar concentrations, in the range of 5%–10% of saturation for dissolved air in water. The dynamical method for determining the concentration has been described. That the water should be degassed was an important aspect of the discovery of single bubble SL. The transient response of the bubble to a sudden increase in $P_a$ at the upper threshold is shown in FIG. 7A. In this case the bubble disappears on the faster time scale required for the sound field to exceed the upper threshold appreciably, but not before an initial increase in the maximum radius and SL intensity is seen.

IV.5 Shock waves

It has been suggested that SL is due to thermal bremsstrahlung emitted from a plasma generated by an imploding spherical shock wave.

As shown in FIGS. 2A and 2B the shock wave theory also yields SL intensities that are extremely sensitive to the drive parameters and furthermore the calculated values are in reasonable agreement with experiment. Since this model does not allow for mass exchange of air between the interior of the bubble and its surroundings through the interface, the model cannot determine $R_0$ and cannot explain the two thresholds described above.

For this reason a comparison of this model to the experimentally observed SL intensity requires the use of data for $R_0$ and $P_a$ as obtained from our light scattering measurements. The range of values attached to the theoretical results shown in FIGS. 2A and 2B arises not from the model but from uncertainties of roughly 0.025 Atmospheres for $P_a$ and 0.25 μm for $R_0$ in the experimental input parameters.

The integrated spectrum for this model is proportional to $\lambda^{-1.5}$ where $\lambda$ is the wavelength of the emitted light. This is a somewhat weaker dependence on $\lambda$ that than observed, but corrections to the formula for the spectrum of bremsstrahlung, due to the fact that the light is emitted from a region smaller than the wavelength of light, may explain this. Furthermore the flash widths of 150 ps, as determined by this model, are reasonably consistent with experiment.

According to the shock wave model the temperature increases without limit provided the shock remains spherical and transport processes can be neglected. For example, a simple calculation for an ideal gas indicates that the shock attains a temperature of $3. \times 10^8$ K. when its radius returns through 10 Å just after the moment of focusing. In the limit of large Mach numbers, a self-similar solution of Euler's equations can be found in which the radius of the shock is $$R_s = A t^\alpha,$$

(1) where t is the time to the moment of focusing and a depends upon the equation of state (for air a~0.7). The determination of A requires knowledge of the launch conditions which are that the shock is moving at Mach 1 (relative to $c_0$, the ambient sound velocity in the gas) when the bubble is collapsing through its ambient radius $R_0$. In fact energy conservation implies that the collapse rate of the bubble obeys $$\frac{\dot{R}(P_0)}{c_0} = \left[ \frac{2}{3\gamma} \frac{\rho_0}{\rho} \left( \frac{R_m}{R_0} \right)^3 \right]^{1/2} = O(1),$$

where g is the heat capacity ratio and $$\rho_0 / \rho$$

is the ratio of densities of the ambient gas and the liquid. Applying the launch condition to (1), $$M = \dot{R}_s / c_0 = (t_0/t)^{1-\alpha}, \, R_s = R_0 (t/t_0)^\alpha,$$

(2) where $t_0$ is the time that elapses between the moment when the bubble radius is $R_0$ and the instant when the shock focuses;

$$t_0 = \alpha R_0 / c_0.$$

(3) The temperature jump across a strong shock is proportional to the square of the Mach number. But after reflection from the origin the outgoing shock moves into the gas previously heated by the incoming shock, and the increase in temperature after focusing is approximately given by $$T/T_0 = M^A$$

where $$T_0 = 300 \, K.$$

is the ambient temperature. In this way one verifies that, 100 ps after focusing, M=4 $R_s$=0.1 μm and T=$10^5$ K. in agreement with the measured characteristics of SL.

IV.6 LIGHT FLASH CHARACTERISTICS

The properties of a single, stable, light-emitting bubble in an imposed sound field, indicate that the SL comes via the clock-like emission of picosecond flashes of light.

1) SL flashes are remarkably short lived. An upper bound of 50 ps has been placed upon these flash widths using the fastest PMTs available. There is the potential for development of a cheap variable intensity, broad spectrum picosecond light pulser. Attempts to resolve the flash width with a streak camera are hindered by low light levels.

2) SL is synchronous. The jitter in the time between successive SL flashes is less than 50 ps. This is remarkable when it is compared to the 40 ms sound period. The synchronicity provides the closest thing to a "hard trigger" that is connected to the SL flashes.

3) The SL pulses are dim. You can see the bubble "glow" in a darkened room. Bright pulses from a bubble, initially seeded as air into degassed water at room temperature and pressure, can contain a million photons. By simply changing drive parameters there is no regime where the SL gets anomalously bright. The flashes have uniform intensity and are spherically symmetric.

V PRODUCING SONOLUMINESCENCE

The technique used to produce single bubble, synchronous sonoluminescence with enough intensity and stability to measure the properties is described.

V.1 Preparing and Driving Resonators.

The resonators used consisted of a set of piezoelectric transducers (PZTs) epoxied to the outer wall of a transparent spherical flask containing distilled water. The PZTs are the source of the sound field used to trap and drive the bubble. A spherical flask was chosen because of its high quality factor (Q) radially symmetric modes. These modes would aid in the production of the large amplitude sound field necessary to produce SL. Because these modes have a pressure antinode at r=0, they trap the bubble at the sphere's center. The glass or quartz walls thus have little aberrant effect on the SL originating from the sphere's center.

A PZT is a crystal or ceramic that produces sound by changing its size when a voltage is introduced across it. The PZTs used were lead titanate-zirconate piezo ceramics. Hollow cylinders polarized radially and disks polarized longitudinally were used. They were ordered with electrodes already present on the appropriate surfaces (Channel Industries, Vernatron, Transducer Products). The cylinders were epoxied to the spheres with their z axis along a diameter of the sphere. The disks were attached by epoxying one of the circular faces to the wall of the sphere.

As shown in FIG. 8, the PZTs are epoxies to the equator of the sphere, with the sphere's neck pointing upward. The epoxy used was a common two-part 5-minute epoxy. This epoxy adequately transmitted the sound energy into the liquid and also allowed the later nondestructive removal of PZTs. Striking a razor blade positioned at the glass-epoxy interface with a hammer separated the PZT from the sphere allowing it to be reused.

A one-liter Pyrex boiling flask was the first resonator used to observe SL. Spheres of various sizes, materials, brand names and properties were eventually tried. The largest sphere in which SL was observed was a five liter glass sphere; the smallest sphere was a ten milliliter quartz sphere. Initially different sized spheres were used to measure SL properties at each sphere's different resonant frequencies. Smaller spheres were eventually used exclusively because they degas faster and require less clean water for each run. Most importantly, smaller flasks can be brought closer to optical instruments, such as streak cameras, monochromators or PMTs, which then catch a greater fraction of the total light emitted. The first flasks used were made out of glass because of its availability (Pyrex®, Kontes®). Later quartz (G. M. & Assoc. synthetic fused silica) was used because it passes more of the UV light emitted during SL.

Any vibration of the sphere changes the shape of the surface of the water in the neck. The pressure field in the sphere is adversely affected. The properties of the SL will accordingly be altered. Smaller flask necks lead to a lessening of surface deformation. Smaller necks also generally make an off-the-shelf flask more spherical. It is also necessary to find at what water level the bubble is most centered and moves least as the drive frequency is changed. There exist water levels at which undesired parasitic vibrations of the system greatly reduce the stability of the bubble's motion.

A resonator can have a single PZT attached to a sphere. Regardless of which sphere was used, the trapped bubble was always positioned slightly off center away from the lone PZT. In addition, the location where the sound field trapped the bubble would change as the drive parameters were modified. This was an indication of imperfect spherical mode shape. With symmetry as a guide, resonators were constructed with 2 PZTs, on opposite sides of the sphere. Although it did not seem necessary to epoxy the PZTs at the equator, this convention was adopted because of its pleasing symmetry. When more than one PZT was used on a sphere, care was taken to have the polarization vectors and applied electric fields oriented to get an additive sound amplitude at the center of the sphere. Adding a second PZT greatly improved bubble performance. The bubble was located closer to the dead center of the sphere and when the drive parameters were changed, the bubble moved very little.

PZTs are capacitors (Hueter, T. 1955: *Sonics*, Wiley & Sons; Wilson, O. 1988: *Introduction to Theory and Design of Sonar Transducers*, Peninsula; Vigoureux, P. 1950: *Ultrasonics*, Chapman & Hall). To improve the driving amplifier's performance high power inductors are located in series with the PZTs. The inductance was chosen so the impedance would be purely real at the drive frequency $\omega$.

It is a LRC circuit so:

$$\omega^2 \equiv 1/LC.$$

Using the inductor brings the current in phase with the voltage so less voltage would be needed to deliver the same power.

Where many different PZTs and drive frequencies are used it is necessary to be able to adjust the inductance. Variable inductors can be used. Alternatively two inductors can be used. The pair of inductors could be brought closer together or further apart, changing their total inductance due to the fringing fields. The otherwise formidable voltage needed to produce sufficient sound amplitudes was greatly reduced by use of the tuned induction circuit. The use of a transformer has also been suggested (Hueter, T. 1955: *Sonics*, Wiley & Sons) to match the high impedance of a PZT to the amplifier used.

A drawback to using the inductors was the formidable electromagnetic radiation they emitted. Detection equipment and cables were kept as far from them as possible. Shielded coaxial cable was used to carry the drive signal whenever possible, and the shield kept as close to earth ground as possible to reduce cross talk into microphones, lock-ins and pre-amps.

The typical acoustical resonances have frequencies from 10 kHz to 60 kHz and Qs of roughly 1000. This means an oscillator with precision and stability of single Hz at these frequencies is necessary to drive the acoustical resonances appropriately.

V.2 Acoustical Resonances of a Liquid Filled Sphere.

The normal modes of a liquid-filled sphere are found by subjecting solutions of the wave equation in spherical coordinates to the appropriate boundary conditions. The necessary math and descriptions of the relevant functions can be found in the literature (Arfken, G. 1985: *Mathematical Methods for Physicists*, Academic Press.).

The wave equation for the pressure wave $\delta P$ in spherical coordinates is:

$$\frac{1}{r} \frac{\partial^2}{\partial r^2}(r\delta P) + \frac{1}{r^2 \sin\theta} \frac{\partial}{\partial \theta}\left(\sin\theta \frac{\partial \delta P}{\partial \theta}\right) + \frac{1}{r^2 \sin^2\theta} \frac{\partial^2 \delta P}{\partial \phi^2} = \frac{1}{c^2} \frac{\partial^2 \delta P}{\partial t^2}.$$ [2.2.1]

where c is the speed of sound in the liquid. Assume the solution is separable and formulate a trial solution:

$$\delta P(r,\theta,\phi,t) = \delta P_0 R(r)\Theta(\theta)\Phi(\phi)T(t).$$ [2.2.2]

The wave to be oscillatory with frequency so:

$$T(t) = e^{\delta}$$ [2.2.3]

Inserting trial solution into wave equation and dividing the result by dP leads to $$\frac{1}{r} \frac{1}{R} \frac{\partial^2}{\partial r^2}(rR) + \frac{1}{r^2 \sin\theta} \frac{1}{\Theta} \frac{\partial}{\partial \theta}\left(\sin\theta \frac{\partial \Theta}{\partial \theta}\right) + \frac{1}{r^2 \sin^2\theta} \frac{1}{\Phi} \frac{\partial^2 \Phi}{\partial \phi^2} + \frac{\omega^2}{c^2} = 0.$$ [2.2.4]

The part of this equation that depends only on $\phi$ can be set equal to a constant:

$-m^2$ $$\frac{1}{\Phi} \frac{\partial^2 \Phi}{\partial \phi^2} = -m^2.$$ [2.2.5]

The function is seen to have a sinusoidal solution $\Phi$ $$\Phi = \sin m\phi.$$ [2.2.6]

After substituting Equation 2.2.5 into Equation 2.2.4, the part depending only on $\phi$ is set equal to the constant $l(l+1)$ The result is:

$$\frac{1}{\Theta \sin\theta} \frac{\partial}{\partial \theta}\left(\sin\theta \frac{\partial \Theta}{\partial \theta}\right) + \left[l(l+1) - \frac{m^2}{\sin^2\theta}\right] = 0.$$ [2.2.7]

The solutions to this equation are the associated Legendre functions $$\Theta = P_\delta^l(\cos\theta)$$ [2.2.8]

Equation 2.2.4 is now reduced to a function of r only $$\frac{1}{r} \frac{1}{R} \frac{\partial^2}{\partial r^2}(rR) + \frac{1}{r^2} l(l+1) + \frac{\omega^2}{c^2} = 0.$$ [2.2.9]

This can be written as $$r^2 \frac{\partial^2 R}{\partial r^2} + 2r \frac{\partial R}{\partial r} + [k^2 r^2 - l(l+1)]R = 0$$ [2.2.10]

where the wavenumber k is introduced via $\omega = ck$.

The standing wave solutions to this equation, which behave nicely at the origin, are the spherical Bessel functions of order l:

$R = j_l(kr)$. [2.2.11]

In summary the standing wave modes inside the sphere will have the form:

$$\delta P(r,\theta,\phi,t) = \delta P_0 j_l(kr) P_2^l(\cos\theta) \sin m\phi e^t.$$ [2.2.12]

Since the acoustic impedance of air is far less than water (Kinsler, L., Frey, A., Coppens, A. and Sanders, J. 1982: *Fundamental of Acoustics*, Wiley & Sons) there must be a pressure node at the sphere's boundary.

$(\delta P(\alpha) = 0)$

The resonant frequencies $f_{l,\kappa}$ are:

$$f_{l,\kappa} = \frac{c\alpha_{l,\kappa}}{2\pi a}$$ [2.2.13]

where $\alpha_{l,\kappa}$ are the zeros of the l th order spherical Bessel function:

$$j_l(\alpha_{l,\kappa}) = 0.$$ [2.2.14]

It should be noted that Equation 2.2.13 does not depend on m and for a given l there are l+1 possible values of m ($0 \leq m \leq l$).

This means there are l+1 degenerate modes with resonance frequency $f_{l,\kappa}$.

Exciting the spherically symmetric modes is affected because they have high Q, have a pressure antinode at r=0, and there is no degeneracy. The spherically symmetric solutions are those for which l=0 and thus m=0. In this case $\Phi = 1$ and $\Theta = 1$.

The zeroth order spherical Bessel function is simply:

$$j_0(kr) = \frac{\sin(kr)}{kr}$$ [2.2.15]

and the zeros of this function are:

$$\alpha_{0,\kappa} = \eta \pi$$ [2.2.16]

After finding the speed of sound in the fluid (Kinsler, L., Frey, A., Coppens, A. and Sanders, J. 1982: *Fundamental of Acoustics*, Wiley & Sons), the resonant frequencies of the spherically symmetric acoustic modes are calculated from:

$$f_{0,\kappa} = \frac{cn}{2a}$$ [2.2.17]

The resonant frequencies for some common sizes of spherical flasks filled with water are tabulated in Table 2.2.1.

TABLE V.2.1

Theoretical Resonant Frequencies of Water Filled Spherical Flasks
speed of sound = $1.5 \times 10^5$ cm/s

| Volume (ml) | Radius (cm) | $f_{\alpha 1}$ (kHz) | $f_{\alpha 2}$ (kHz) | $f_{\alpha 3}$ (kHz) |
|---|---|---|---|---|
| 10 | 1.34 | 56.0 | 112 | 168 |
| 100 | 2.88 | 26.0 | 52.1 | 78.1 |
| 250 | 3.91 | 19.2 | 38.4 | 57.5 |
| 1000 | 6.20 | 12.1 | 24.2 | 36.3 |

Modes that are not spherically symmetric have resonance frequencies found scattered between these spherically symmetric modes, but the l=0,n=1 mode is the lowest frequency mode of the sphere.

V.3 Water Degassing.

Degassing the water is required. Consider a bubble, in water saturated with air, oscillating due to a sound pressure amplitude of a few atmospheres. Rectified diffusion will cause the bubble to gradually intake air from the water. The bubble will grow, its oscillation will become unstable and eventually it will become too large to remain trapped by the sound field. In order to keep a bubble stable and drive it with the sound pressures necessary to produce SL, the air in the water must be removed. Techniques for degassing liquids include boiling the liquid, stirring the liquid under vacuum (Battino, R., Banzhof, M., Bogan, M., and Wilhelm, E. 1972: "Apparatus for Rapid Degassing of Liquids, Part III," Anal. Chem. 54, 806–807) and applying a large amplitude sound field to the liquid under vacuum (Leonard, R. 1950: "The Attenuation of Sound in Liquids by a Resonator Method," Technical Report, UCLA). The sound field degassing technique and found it to be effective for removing the necessary amount of air from the water.

FIG. 8 illustrates the apparatus used during the degassing of water contained in a spherical flask. Degassing the water in the flask prevented contamination, especially reaeration, during liquid transfer. The water used was filtered through sub-micron filters and then sterilized by a UV lamp until a typical resistivity of about 18 MΩ was achieved. A roughing pump provided the necessary vacuum. A Drierite® $CaSO_4$ water trap kept water vapor from intruding into the pump's oil. A small metal spike attached to the cork burst large bubbles climbing the flask's neck. These bubbles would have otherwise been sucked into the vacuum line.

Sound pressure amplitudes of a few atmospheres were sufficient to create many bubbles in the liquid, especially near the walls of the flask, which would then oscillate and grow as they rose to the surface. Driving the sphere in one of its radially symmetric modes described took advantage of the large sound field generated at resonance. The drive was shut off periodically, which allowed bubbles to rise to the surface after they had been created and enlarged by rectified diffusion. Degassing a 1 liter sphere took over thirty minutes. One of the benefits of using 100 ml spheres was that it took only fifteen minutes to degas these smaller resonators. The bubbling can continue indefinitely, probably due to the creation of vapor filled cavities. The only way to know if the water had been sufficiently degassed was to stop degassing and check if stable SL was possible.

V.4 Finding Sonoluminescence.

Finding the correct parameters to produce SL in a given spherical flask are as follows:

Step I: degas the water, as described in the previous section.

Step II: adjust the inductor. Set the drive oscillator to the calculated acoustic resonant frequency. If the current through the PZT circuit leads the voltage across it, increase the inductance until they are in phase. Two inductors in series, wired with opposing helicity, increases in total inductance when brought closer together due to the effect of the fringing fields. If a single inductor is used, the inductance can be increased by bringing a piece of iron close to it. A variable inductor could be used, but the use of the mutual inductance phenomenon allows for quick adjustment over a large range of inductances.

Step III: precisely find the acoustic resonant frequency. A microphone can be used outside the sphere to detect the increase in pressure amplitude at the resonance. It is easier to locate the resonance using the characteristic dip in the drive current's amplitude and the "glitch" in the drive current's phase seen at the resonance frequency. FIG. 9A shows the amplitude and the phase of the drive current when the drive voltage is used as a phase reference. FIG. 9B illustrates the phase of the current relative to the voltage. The broad amplitude peak and slow change in phase (Q~50) are due to the resonance of the LRC circuit made by the tunable inductor and the capacitance of the PZTs. The narrow dip in amplitude and glitch in the phase at about 25.2 kHz are due to the change in the impedance seen by the drive, caused by the acoustic resonance (Q~1000). It is easy to see these effects on the oscilloscope already used to adjust the inductance, so the drive frequency can be tuned to resonance using no extra equipment. After tuning to the acoustic resonant frequency, make one final adjustment of the inductance to maximize the current.

Step IV: introduce a bubble. Draw a small amount of water into a syringe or an eyedropper bulb attached to a hypodermic needle. Withdraw the needle from the liquid and with the acoustic drive on, squirt some water through the surface. This will drag some air bubbles into the water. Alternatively thrusting a probe, a thin metal rod, through the surface will usually drag air bubbles into the water. This second method typically introduces less excess air into the fluid, slowing the need for additional degassing. If an overtone of the resonator is being used, unwanted bubbles will usually get trapped at the spherical antinode shells in addition to the desired bubble being trapped at r=0. The unwanted bubbles can be remove by lowering a probe near them, then after they adhere to the probe, simply remove them. This will usually not interfere with the bubble at r=0.

Step V: adjust the amplitude of the drive. FIG. 10 is a reproduction of a figure indicating qualitative behavior of bubbles driven by different pressure amplitudes (Gaitan, F. 1990: Ph.D. Thesis, National Center for Physical Acoustics, University of Mississippi). At a low drive level the radiation forces, are so weak that the bubble will not be trapped at the center of the sphere. As the drive level is increased above the trapping threshold, the bubble will be attracted to the center, but the drive level is too low to provide adequate rectified diffusion. The bubble will slowly shrink and disappear on the scale of seconds. Above the dissolving threshold the bubble will remain trapped indefinitely at the center of the sphere.

As seen in FIG. 10, the bubble again loses its stability when the drive is increased beyond the dancing threshold. In this regime the bubble moves violently around the center of the sphere, and has the appearance of a collection of bubbles. As the drive is increased above the lower SL threshold, the dancing ceases and the now stabilized bubble appears very small. The bubble glows very dimly at the threshold but gets ever brighter as drive is increased. Unfortunately there is an upper limit. Near the upper SL threshold the light emitting bubble will begin to blink; it dims suddenly then returns to its original brightness gradually on the scale of a few seconds. Above the upper SL threshold the bubble will be destroyed during one of these blinks. When data are to be acquired from the SL emission, a drive level should be chosen to make the SL bright enough for the measurement, but the drive level should also be kept low enough so that the bubble's stability is not sacrificed.

VI Apparatus and Methods

With a sealed system, the SL cell creates and generates picosecond flashes of light useful for different technologies. The spectrum of light is broad band and concentrated in the UV. The flashes have a peak power reaching 100 mW. The flashes come out in a clock-like fashion from 1,000 cycles up to 100,000 per second. The light emission is uniform in all directions, namely directed spherically from a point source.

VI.1 Sealed system:

When a gas and a liquid mixed together partially fill a vessel, the mole fraction of the gas dissolved in the liquid is related to the partial pressure of the gas in the gas-vapor mixture in the space above the liquid. Reviews of the extensive experiments relating the partial pressure and the mole fraction are in the literature. We then adequately can describe the gas concentration by measuring the total pressure above the liquid and accounting for the vapor pressure.

A preferred gas passing manifold is pictured in FIG. 11 and a preferred method of preparing gas and filling the resonator are described in this section. An aspirator bottle is a nice choice for the preparation vessel because it comes with a port at the bottom for transferring of the liquid into the resonator after the gas concentration has been determined. When gas is being added to or removed from the liquid, the steady state is reached more quickly if the water is stirred vigorously by a magnetic stirrer. If a gas other than air is to be used for an experiment, the naturally dissolved air must first be removed from the liquid. An empty container of comparable or greater volume than the space above the liquid in the aspirator bottle is evacuated to a pressure far below that in the bottle. The vacuum pump is valved off and the gas-vapor mixture from the aspirator bottle is allowed to expand into the second container through some fine mesh $CaSO_4$ dessicant to remove the vapor. After many repetitions a Pirani pressure gauge in contact with the secondary volume after the dessicant shows that little gas remains in the liquid (we are typically happy with 0.1 mm when we add back 10s of mm of another gas because Nitrogen has little effect in trace amounts). Regassing the liquid with the desired gas can then be done through a valve at the top of the aspirator bottle. A mechanical gauge (Wallace & Tiernan e.g.) is used to measure the pressure above the liquid because electrical pressure gauges are gas dependent and typically calibrated for air only. Before regassing, the gauge shows the vapor pressure at the room's current temperature. The gas is then added to the desired pressure correcting for the vapor pressure.

The resonator to be filled is in communication with the vapor-gas mixture during the degassing-regassing so that transfer does not change the concentration. The transfer is achieved by gravity or assisted by a sealed pump, but a gas return line is necessary in addition to the liquid fill line to return the displaced gas for a complete fill. The resonator is completely filled and some liquid is allowed to enter the gas return line such that the liquid level is outside each of the resonator's valves. The hydrostatic pressure in the water is the same as read from the mechanical gauge if gravity is neglected. We typically wish to push the liquid to a higher hydrostatic pressure because the liquid is saturated with respect to the gas if it remains at this pressure and bubbles will form everywhere once it is sonicated. This is the incorrect state for single bubble SL.

To control the static pressure in the liquid, the resonator incorporates a movable element to communicate the pressure of the fluid with the atmosphere (to maintain 1 Atm) or to a vessel of known pressure. In one arrangement the moveable element is a piston, one side of which sees the pressure in the resonator; the other face is open to a reference pressure. The piston is clamped against the low pressure during degassing, regassing and transfer, and is allowed to move once the resonator is filled and sealed. Another arrangement is to allow the fluid to partially fill a latex balloon which communicates with the resonator. The pressure on the outside of this balloon can be changed by placing it in a pressure-controlled vessel.

The pressure in a completely stiff resonator would change with the laboratory temperature due to the thermal expansion of the liquid. For example, changing the temperature from 1° C. to 40° C. causes the density of the water to change by ~1%. Any pressure relieving mechanism keeps the pressure at a desired and known pressure regardless of temperature.

Other realizations of sealed systems are found in FIGS. 12 and 13.

In an open resonator the liquid's surface remains exposed to the air and a preferred way to seed a bubble was done by jetting a small quantity of liquid through the surface. Small bubbles are introduced into the water and these were forced to the center of the sphere by radiation pressure. The bubbles coalesce and the remaining single bubble's size is determined by diffusion dynamics coupled with the bubble's oscillation. Introducing a bubble into a sealed system requires use of the elements present in the liquid-gas mixture. A preferred method of creating a bubble in a sealed system involves locally boiling the liquid by sending a high current through a small piece of Nickel-Chromium (NiCr) wire welded to large gauge copper wire makes cavities into which air diffuses and these bubbles result in a single bubble at the center as before. The boiling method has the advantage over electrolysis that it will work in nonionic liquids. The heat introduced is a small perturbation and dissipates quite rapidly. Preferred NiCr wire has a diameter of 10 mils and a typical length of 3 mm. A power supply and momentary switch provide ~1 Amp to heat this wire.

A preferred way to connect the Copper wire to the NiCr wire is to use an Acetylene-Oxygen torch. The Copper wire is heated until its tip melts into a ball. Simultaneously a piece of NiCr is heated to red hot but not melted. This is easiest if the NiCr is a long piece so heat is carried away from the tip. The heated NiCr is then stabbed into the molten ball of copper. The NiCr is then cut to its final size and during production of the second joint, the copper wire past the first joint carries sufficient heat away to keep the NiCr from melting.

Another preferred method for creating a bubble is to momentarily increase the drive to produce cavitation (typically 10 to 20 times above the drive necessary for producing sonoluminescence). As with the NiCr heater, gas diffuses into the cavities from the liquid to form bubbles which coalesce at the center.

VI.2 A Self Starting SL System

A set of electronics has been developed which can introduce a bubble by cavitating the liquid through a high sound field and then corrects itself to drive the bubble at a desired level.

A relaxation oscillator is one whose amplitude is growing to a steady state which it never reaches because some catastrophic event happens to reduce the amplitude. This event takes a large amplitude to get started but can be sustained to low amplitudes as it reduces the oscillation. The event ends as the amplitude gets too small. The process then repeats. The classic example is a capacitor being charged until a spark in a lamp is excited and the capacitor drains.

A feedback oscillator is one such that a signal derived from the output of the oscillator is phase shifted, amplified and sent back into the system such that the oscillation will grow. The differential equation has a form like:

$$M\ddot{z}+b\dot{z}+kz=T(z,\dot{z},\ddot{z})Ge^{i\phi}$$

Where T is a function of $$z, \dot{z}, \text{ or } \ddot{z}$$

G is the feedback gain and $\phi$ is the feedback phase shift. The phase $\phi$ can be adjusted so that the signal fed into the system is 180 degrees out of phase with the dissipation $$(b\dot{z})$$

and G can be adjusted to be larger than b. If this is done the circuit is unstable to oscillation buildup at its natural frequency. If during oscillation the gain is adjusted to exactly 1, the amplitude will remain constant because feedback is precisely balancing dissipation.

The feedback oscillator used drives an acoustic resonator to produce SL (FIG. 22); a signal measuring the acoustic oscillations in the resonator is amplified and phase shifted and sent to driving transducers. Unlike the oscillator above, the acoustic resonator has many modes so the driving circuit incorporates a band-pass filter to select only the desired acoustic mode. After choice of a proper feedback gain and phase shift, the oscillation exponentially increases to such an amplitude that a bubble is created in the system by exceeding the cavitation threshold. Gas dissolved in the liquid diffuses into the cavities, forming bubbles which coalesce at the pressure antinode to form an SL bubble. The bubble acts as an additional source of dissipation, effectively increasing b in the equation above.

Unlike the classic relaxation oscillator a single catastrophe can occur. A final steady state can be reached if the bubble remains in the system and it reduces the gain of the loop to 1. If the loop gain (G-b) is chosen to be slightly above 1 when no bubble is present, a bubble is created during loop run away, and this bubble grows and dissipates more energy until the dissipation exactly matches the feedback and a steady state oscillation is achieved. Once a bubble has established a steady state, increasing G increases the acoustic amplitude, but a new steady state is achieved when the bubble increases its dissipation to the point where the total gain is returned to 1. Thus the amplitude of the sound field with a captured bubble may be adjusted by changing the gain of the feedback. If the gain is set so high that the drive is too large for the bubble to exist, repeated creation of bubbles and driving them to their death occurs thus recovering the classic relaxation oscillation.

This system of drive also has the advantage that if the natural frequency of the system changes, the resonance is tracked. If the function T described above varies slowly with frequency, the amplitude of oscillation remains constant as the frequency changes if the phase shift is kept unchanged.

The circuit used provides both the phase shift and gain necessary to the technique. In FIG. 14 an Operation Amplifier (op-amp) #1 is a differential amplifier used so that two shielded coaxial cables can be used to reduce noise on the input line. The gain is $\frac{1}{10}$ because the voltages from PZTs can be quite large. Op-amp 2 is a unity gain buffer which can drive a low input impedance without draining the other circuitry. Op-amps 3 and 4 act as a unity gain phase shifter at the resonance frequency allowing an inductive shift or typically providing 90 degrees of inductive shift so the next stage provides −90 to 90 degrees of capacitive shift instead of 0 to 180 because a resolution of around 0 degrees is needed. Op-amp #5 provides the high input impedance necessary to make the first phase shifter work correctly. Op-amps 6 and 7 provide unity gain capacitive phase shift at the resonant frequency. Op-amp #8 is a variable gain non-inverting amp used to adjust the G discussed above and it provides a high input impedance for the output of the capacitive phase shifter.

A variation on this circuit does not create a bubble automatically but does not rely on the dissipation of the bubble to define the final acoustic amplitude. If a comparator is triggered from the phase shifted signal correlated to SL, the phase information is preserved but the amplitude of the comparator's oscillation is constant. The resulting square wave is filtered to a sine wave and amplified before using it to drive the source transducers. This circuit tracks with a changing frequency and is driven at any chosen level.

VI.3 Mode Locking the SL System

The ability to maintain constant intensity SL depends on keeping the sound field felt by the bubble as constant as possible. Certain conditions which change in the operating environment such as temperature can change the acoustics and the use of feedback is necessary.

The change in the phase of the acoustic oscillation in the resonator, or of the light emitted by the bubble is used to correct the drive frequency so that the response amplitude remains constant (FIG. 23). A lock-in amplifier is used to measure the phase difference between its input and a reference which we choose to be the drive. As the resonance frequency shifts, perhaps due to temperature changes, there is an associated phase change between the drive and the response signal. The phase changes monotonically with frequency near resonance so that the voltage produced by the lock-in proportional to this phase can be used to make corrections to the oscillator frequency. The lock-in reference phase is adjusted to produce 0 V at the resonant frequency. The lock-in phase output is integrated to provide and error signal which controls the frequency of a voltage-controlled oscillator (VCO). The frequency may be adjusted over a small range near resonance by changing the lock-in reference phase.

Signals used for input to the lock-in show the phase change associated with the natural frequency change. Choices which have been successfully used include the voltage from a microphone outside but near the sphere, the voltage from a PZT cemented to the sphere, the current drawn by the PZTs and the signal from a photomultiplier tube (PMT) detecting the SL.

The integrator circuit used is shown in the FIG. 15. $R_0$ is used to provide a large but finite input impedance. The input current $V_1/R_1$ flows through the capacitor $C_1$ around the first operational amplifier, op-amp 11 producing an output voltage which is $-1/(R_1C_1)$ times the integral of $V_{in}$ with respect to time. The op-amp II is trimmed to reduce input offset voltage. The resistor $R_5$ is used to reduce the effects of input bias current. $R_2$ provides dc feedback to keep the circuit stable from drifts by reducing the action of the op-amp below frequencies of $\sim 1/(R_2C_1)$. Since the first op-amp 11 inverts the integral of $V_{in}$, the second op-amp is used re-invert the signal and also to provide the necessary gain by adjusting $R_3$ and $R_4$ to keep the VCO at the correct frequency. $C_2$ keeps the second op-amp from oscillating. Op-amp 22 is also trimmed to reduce the input offset voltage and $R_6$ is used to reduce the effects of input bias current. The feedback loop is broken by closing the reset switch, effectively grounding the input to op-amp 22. The reset switch is closed to initially set the VCO to the natural frequency of the resonance and initially zero the phase signal from the lock-in.

VII Applications

VII.1 Light Scattering

As illustrated in FIG. 16, it is possible to determine the radius of the bubble by a light scattering technique. A laser is directed towards the center of the cell, the laser being a 1 to 10 mW He—Ne laser. There is a trigger PMT located with a short pass filter between the trigger and the cell. With a digital delay this acts to trigger or be triggered by the laser as necessary. There is a second signal PMT which has a long pass filter and a line pass filter between it and the cell. The intensity of light scattered is related to the radius of the bubble. Through this system the size of the radius of the bubble can be measured. These measurements are depicted in FIG. 6 (upper curve) wherein the radius is measured as a function of time for the bubble driven with an amplitude below the SL threshold. The radius of the bubble as a function of time is matched to the solution of the diffusion equation $$C_\infty = \frac{1}{\tau(T_a)} \int_0^{T_a} \frac{C_0 R_0^3}{R^3(\tau')} d\tau'$$

where $C_\infty$ is the concentration of dissolved gas in the fluid, $C_0$ is the saturated concentration of gas in the fluid, $T_a$ is the acoustic period, $R_0$ is the ambient radius and $$\tau(t) = \int_0^t R^4(t')dt'.$$

This yields the concentration of the dissolved gas in the liquid. For the bouncing motion the measurement is in accordance with the equation. As the solution becomes gassy the light scattering measurements approach the saturated value of the equation.

VII.2 Fluorescence Measurement

As illustrated in FIG. 17, a sample is located adjacent to an SL source. The sample is excited by the SL source so that fluorescent light emanates from the sample. The SL source provides a broad band, for instance, between 200 nanometers and 700 nanometers of short wavelength light. This is directed in a spherical direction. The fluorescent light from the sample is passed through a monochrometer or a filter and is then read by a photodetector. The photodetector will sense the SL flash and also the fluorescent response from the sample. The difference in the time, $\Delta T$, is the time delay for decay to being. $\Delta T$ maybe zero. The fluorescent decay time is $1/\alpha$, the so called lifetime of the fluorescence sample. In this manner it is possible to ascertain whether one or more fluorescent elements are contained in the sample and the particular wavelength of fluorescence. The device can excite a spectrum of multiple lights at the same time.

VII.3 Calibration

It is possible with the invention to calibrate instruments such as photomultiplier tubes or arrays of detectors.

As illustrated in FIG. 18, an SL is located adjacent to five detectors. There is also a mark flash segment for indicating the timing of the initial flash.

The detectors and the marker detector respond to the SL flash, and has indicated the different time delays of each detector gives an indication of how the detectors need to be calibrated. In this sense the radiation of this light from the SL is directed over $4\pi$ stearadiants and is synchronized in that sense. Accordingly, detector calibration can be accurately performed.

VII.4 FUSION

VII.4.1 Fusion Energy

The invention has been illustrated extensively with regard to the converting acoustic energy to the different energy form, namely SL. The data and theory strongly support that the invention is equally applicable to the energy form of fusion. The following description of the invention relates to the prospective exemplification of the invention in relation to fusion.

The passage of a sound wave through a fluid with a trapped bubble of air can lead to the emission of picosecond flashes of light whose repetition rate is synchronous with the sound. As indicated in FIG. 1 the spectrum of the emitted light increases into the ultraviolet. This phenomenon, SL involves the concentration of acoustic energy by at least 12 orders of magnitude so as to generate light.

The energy amplification characteristic of SL could extend an additional 3 orders of magnitude to the regime where thermonuclear fusion would occur. In particular, the 14-MeV neutrons would be emitted from the deuterium-tritium fusion reaction,

This remarkable possibility exists because the spectrum shown in FIG. 1 has no apparent peaks or energy scales. This data must therefore lie on the tail of some process which is peaked at a much higher energy. It is important to note that the measurements shown in FIG. 1 stop at 200 nanometers [6 eV] because the water surrounding the bubble does not transmit light of shorter wavelength, namely higher energy. Since the transmission does not turn on again until 5 keV, the limits of the energy amplification which can be achieved with SL have yet to be determined.

SL is due to the energy concentration which results from the implosion of a spherical shock wave. The shock is launched inward through the gas bubble as it collapses supersonically during the compressional part of the sound cycle. Collapse velocities in excess of Mach 1 are apparent in FIG. 19 which shows light scattering measurements of the bubble radius vs. time. The breathing motion of the bubble during a complete cycle of sound is shown in FIG. 20. There are three characteristic bubble radii: the ambient radius $R_0$ (~4 microns) which is the average or 1 Atmosphere radius of the bubble, the maximum radius $R_m$ (~40 microns), and the minimum radius $R_c$. In addition the collapsing bubble launches a shock wave into the gas which continues inward and generates excitations of order 6 eV when its radius is about 1,000 Angstroms. And if the shock holds together when its radius is as tiny as 60 Angstroms, then portions of the bubble should reach the conditions appropriate to fusion. For a deuterium-tritium bubble this idealized model yields about 40 neutrons per second.

For SL a coherent phonon field primes the collapse of the small spherical bubble containing a D-T mixture. The key parameter which controls the efficiency of the energy concentration is the sphericity of the shock wave. Finally SL also involves a preheating of the bubble contents. In this case the collapse of the bubble radius to $R_c$ adiabatically heats the entire bubble contents to about 1 eV at which point the imploding shock is then launched. A typical SL experiment yields 35,000 implosions per second.

A block diagram of the system for creating fusion energy is shown in FIG. 13. A D-T bubble is trapped at the center of a flask driven in its fundamental acoustic resonance. When the drive is turned up to the point where the bubble implodes so as to generate SL a neutron emission could occur and be measured.

The basis for this emission are summarized in the Table, which shows the increasing degrees of energy concentration that are achieved as the imploding shock wave reaches smaller radii.

TABLE

Energy Concentration Due to Shock Wave Implosion
(Calculated for $R_o \sim 4$ μm)

| Time After Focusing | Shock Radius | Mach # | Temperature | Phenomenon |
|---|---|---|---|---|
| 100 ps | 1,500 Å | 4 | $10^5$ K. | Sonoluminescence |
| 5 ps | 200 Å | 10 | $3 \times 10^6$ K. | Soft X-Rays† |
| 0.1 ps | 15 Å–(60 Å)* | 30 | $3 \times 10^8$ K. | Fusion |

*Computed for Van der Waals equation of state.
†Note that soft x-rays do not propagate through water.

The neutron detection scheme uses liquid scintillators which are capable of resolving both the neutron energies and times. This scheme allows the measurement of the neutron time of flight which can be conveniently compared to the accompanying flash of light from the sonoluminescence. The SL provides an event marker that will enable a tiny (1 ns) window in time can be picked out during which events will be accepted, thereby dramatically lowering the background.

VII.4.2 Sonoluminescence from a D-T Gas Bubble in Water

FIG. 13 shows the overview of the apparatus. The central part of the apparatus is a spherical quartz flask on the surface of which are mounted ceramic PZT transducers. When driven at a frequency corresponding to the fundamental resonance of the water-filled flask, amplitudes can be reached where a bubble of gas can be trapped at the velocity node, namely=pressure antinode, at the center of the flask. As the amplitude is increased the pulsations of the bubble become large enough that they generate imploding shock waves which lead to the emission of one flash of light for each cycle of the sound field. Normally this effect is observed with photomultiplier tubes. The contents of the bubble are controlled to that of an appropriate D-T mixture.

Characteristics of the system are derived from the following:

a) Cooling the water in which the SL occurs to 1° C. dramatically increases the SL emission and furthermore shifts it into the far ultraviolet. The spectrum for air at 1° C. is shown in FIG. 1 and the dramatic change of SL intensity with water temperature is shown in FIG. 2A.

b) Generating SL in a sealed system, i.e. no free surface, enables one to use gases other than air. The problem to overcome is that of seeding a bubble of gas into a sealed flask of liquid. This has been achieved with a nichrome wire heater. A burst of current into the heater creates a vapor bubble which then promptly fills with whatever gas is dissolved in the liquid. The gas bubble then gets yanked to the center of the flask where it undergoes the oscillations that generate SL.

c) Dissolving gases of choice into the water, degassing of liquids, and fluid transfer all under a controlled atmosphere. Careful control of this procedure is essential due to the effects of doping the gas bubble with small percentages of Argon. As shown in FIG. 4 a few percent of Argon dramatically increases the SL emission. The air is first removed from the water then the appropriate D-T argon mixture is dissolved into the water and then the bubble is seeded and the effects measured.

d) Mode locking SL to the sound field enables it to be stabilized over long periods of time. The appropriate feedback loops are used for this procedure.

In the event of a positive signal the "controls" are a key aspect. In this direction the SL fusion is run with hydrogen bubbles, deuterium bubbles and the D-T mixture. In addition these bubbles are doped with argon or xenon. Various sources of noise including electrical cross-talk, should be resolved by comparing these different configurations. In addition the neutron counting scheme provides three cross checks for a positive signal.

VII.4.3 Imploding Shock Wave Theory of Sonoluminescence: Extension to Acoustically Driven Fusion As shown in FIGS. 19 and 20, there is a portion of each acoustic cycle during which the bubble radius collapses at a rate which is faster than the speed of sound of the gas in the bubble. This collapse then radiates an imploding shock wave which is directed inward toward the center of the bubble. The radius of the bubble-water interface is denoted by R and the radius of the launched shock $R_S$, then this situation is pictured in FIG. 21. As the shock implodes towards the focus or origin, the temperature and pressure increase with decreasing $R_S$. At the moment of focusing $R_S=0$, the imploding shock is converted into an outgoing shock which then slams into the already heated matter and therefore results in yet an additional heating. The simplest model for SL which is reasonably consistent proposes that the light emission is due to the thermal Bremsstrahlung generated by the shock wave heating of the gas in the bubble. Shown in FIG. 2 is a comparison of this model with our measurements. The fact that the calculated values of SL intensity are the same order of magnitude as experiment and that they change by the requisite factor of 200 between 40° C. and 1° C. constitute strong evidence for the validity of this model.

From the shock wave scaling arguments discussed previously, one can obtain the above Table which describes the degree of energy concentration as a function of the length scale on which the shock remains intact. Also shown is the time over which these temperatures apply.

The measurable portion of the SL spectrum is reasonably consistent with the entry on line 1 of the table, namely 100,000 K. for 100 ps. Whether the shock remains intact down to length scales under 100 Å will determine the feasibility of fusion. In addition to the analytic estimates derived above, the fluid mechanical equations have been simulated for a gas bubble with a van der Waals equation of state. The results are generally consistent with the table and for the bottom line yield 60 Angstroms instead of 15 Angstroms.

The neutron yield is estimated based upon the bottom line of the table. The neutron emission rate is determined by the standard formula $$N = n^2 \overline{\sigma v} R_n^3 \Delta t_n / \tau_a$$

where n is the number density of atoms ($\sim 10^{23}$/cc at focusing), $R_n$ is the radius of the hot region, $\Delta t_n$ is the length of time during which the temperature is high enough for significant fusion to occur, $\tau_a$ is the acoustic period which determines the number of implosions per second, σ is the reaction cross-section, and v is the relative velocity of reacting nuclei, the overbar indicates the statistical average of σv:

$$\overline{\sigma v} = 4 \cdot 10^{-12}(\tilde{T}^{-2/3}) \exp(-20\tilde{T}^{-1/3}) cc/s$$

where $\tilde{T}=T/1.16\times 10^7$ K. The maximum value occurs when $\tilde{T} \approx 10$; this motivated our choice of T in the preceding estimates. Calculations for the case $P_a=1.425$ Atm, $R_0=4$ μm, $1/\tau_a=25$ kHz show that, for an air bubble modeled as a van der Waals gas (for which a~0.5), a temperature of $10^8$ K. is attained at a distance of R=60 Å from the center of the bubble and lasts for a time of order 0.1 ps. This computation yields about 40 neutrons/s, but the results are very sensitive to the launch conditions, in part because a depends strongly on these conditions in a van der Waals gas. For instance, at $P_a=1.375$ Atm, the computed yield is less by a factor of 10. These computations neglect the emission of an outgoing shock by the bubble surface and the fusion rate given above may have to be modified for a dense system where binary collisions may not make the dominant contribution to N. A parallel exists between the shock wave model of SL and efforts aimed at developing inertial confinement fusion. In each case the level of energy concentration which can be attained is limited by the stability of an imploding shock wave.

These estimates neglect thermal radiation transport, thermal conductivity, shock wave corrugation, and changes in the equation of state due to the high pressure and temperature. In a sense fusion is being used as a means of probing the level of focusing which is achieved by the imploding shock wave that leads to SL.

VII.4.4 Neutron Detection

There are several established methods for detecting neurons with energies $E_n$ in the 1–20 MeV range. Such neutrons are called "fast neutrons" or even "high energy neutrons" because they are more energetic that thermal or epithermal neutrons, but these "fast neutrons" actually have much lower energy than the neutron beams (many GeV) used in high energy physics. Fast neutron detectors are variously used in basic nuclear physics experiments and for monitoring nuclear reactor operation, fusion reaction tests, and radiation dosage to people and equipment.

Different fast neutron detection techniques are possible. For each technique, a major goal is to suppress the background due to gammas which might be mistaken for neutrons. The preferred counter is a liquid scintillation counter.

VII.4.4.1 $^3$He Proportional Counters

Very low energy neutrons have a high cross section for capture on $^3$He via the reaction n+$^3$He → $^1$H+$^3$H+765 keV. The 765 keV of energy of released appears as kinetic energy of the proton ($^1$H) and triton ($^3$H). Neutron detectors based on this reaction typically have the $^3$He gas in a proportional tube where by the recoiling proton and triton ionize the gas, and the ionization is amplified and collected on a wire.

VII.4.4.2 Boron-loaded Plastic Scintillators

In a scintillator, neutrons collide with protons, and the recoil protons create ionization which leads to light emission. Low energy gammas Compton-scatter off electrons, which also create ionization which leads to light emission. In plastic scintillator, these prompt light pulses are similar, so that an additional trick is needed to reject gammas.

VII.4.4.3 Liquid Scintillators

Unlike plastic scintillators, liquid scintillators such as NE213 respond differently to gammas than to neutrons [15, 16]. Crudely speaking, the scintillation light has a fast component which decays away in a few ns, and a slow component which decays away in about 100 ns. The heavily-ionizing recoil protons from neutrons yield more of the slow component than do the Compton-scattered electrons from gammas. The resulting difference in pulse shapes has for many years formed the basis of using liquid scintillators for detecting fast neutrons while giving good rejection against gammas.

There are numerous published papers detailing electronic circuits which effect this "pulse shape discrimination" (PSD) of neutrons and gammas, typically demonstrated with the scintillator NE213 (NE Technology Ltd.) Using only PSD, gamma rejection of a factor of 100 is completely routine with off-the-shelf electronics, and a factor of 1000 is attainable.

Neutron detection efficiencies of a few percent to 20% have been documented, with excellent timing. The timing allows neutron energy measurement via time-of-flight techniques if the neutron is emitted at a known time and location. At least two ultra-low background neutron detection systems have used NE213.

In NE213, neutron energy measurement based solely on the pulse height is somewhat limited. This is because the energy imparted to the first recoil proton can vary over a wide range, and summing on the energies of recoil protons from further collisions is compromised by nonlinearities in the scintillator response and escape of neutrons before complete energy deposition. However, this liquid scintillator is available in deuterated form as NE230, in which all the protons ($^1$H) are replaced by deuterons ($^2$H). The neutron-deuteron elastic scattering cross section is strongly peaked in the backward (for neutron) direction, resulting in deuteron recoil-energy peak at about 8/9 of the neutron energy. Hence the observed line shape from mono-energetic neutrons impinging on NE230 should be distinctly sharper compared to NE213.

The counter requires inter-changeable NE213 and NE230 scintillating elements (or equivalent).

In SL, the neutrons would be emitted in a known, submillimeter, location at precisely reproducible, sub-nanosecond times relative to the accompanying flashes of SL light. Neutron arrival times should be easily measurable to a few nanoseconds with the scintillator, and SL light bursts occur every few microseconds. Hence, the timing allows an additional rejection of gammas by a factor of 1000, above and beyond that attained with PSD.

Furthermore, the time-of-flight (TOF) of the neutrons can be measured from the SL source to the liquid scintillator detector, and hence the neutron energy with reasonable resolution can be inferred. With the NE230 elements, this measurement is checked for consistency with the energy inferred from the pulse height information, for further background rejection.

The precise power of the TOF information depends on the details of the scintillator design and the properties of the photo-multiplier tubes used. For a scintillator of a given size, there is a tradeoff between detection efficiency and TOF resolution, since the geometrical contribution to the detection efficiency worsens with distance from the source, while the TOF resolution improves. The mechanical design allows for optimization of efficiency while searching for a signal or while setting limits, at a cost in TOF resolution. On the other hand, if a clear signal exists, the detectors can be moved away from the source, sacrificing some detection efficiency in order to obtain better TOF resolution.

A 4-element detection system is used with each element will be a glass container (cubical or cylindrical, approximately 10–15 cm each linear dimension) containing the liquid scintillator, sealed by the manufacturer to guarantee purity and lack of dissolved gas. Two photo-multiplier tubes (PMTs) will view each container in order to optimize light collection and guard against spurious noise. Two detection elements are placed at one distance from the SL spot, and other element at a different distance. In the event neutron candidates are observed, the expected fall-off with distance from the SL spot can thus be checked.

The SL flash itself will be viewed by a separate PMT of the type being used for SL studies.

For the first measurements, relatively conventional electronics modules are used. Commercial NIM discriminators, logic units, and single-channel analyzers will be used for providing triggers, gates, PSD signals, etc. Time intervals and pulse sizes are digitized using commercial TDCs and ADCs in CAMAC modules with standard interface to the data acquisition computer.

Events will be written to disk and archived on 8-mm magnetic tape cartridges. Data analysis will proceed with custom FORTRAN programs interfaced to existing standard workstation histogramming packages such as PAW (CERN Program Library).

Each event record will contain all the digitized information (pulse height, times, etc.) corresponding to one event trigger signal. Initially, implementing trigger signals at every SL pulse and at various times between SL pulses, provides a thorough set of data for background studies. Then pre-scale the trigger (i.e., record only every nth such trigger, where n is an adjustable integer) by a reasonable amount, and also implement a more restrictive trigger which demands some activity in the liquid scintillator system. The pre-scaled trigger and this latter trigger will be logically OR'ed to form the master trigger for computer acquisition. The precise nature of the demand for activity in the liquid scintillator (e.g., signals above some discriminator threshold for one or more tubes or analog sums of various tubes) will be flexible and tuned as experience is gained. These trigger requirements are as loose as possible so that the real data selection occurs in the off-line analysis where selection criteria can be better understood.

The detector response, data acquisition, and analysis systems are exercised and calibrated using standard commercially available neutron sources, Californium-252 ($^{252}$Cf) and Am-Be.

After completing check-out, initial data-taking, and preliminary data analysis, the detection elements and increase the sophistication of the electronics in order to increase the geometrical acceptance, increase the time-of-flight distance, or provide more pulse shape information can be modified.

If no definite signal are detected and noise levels are not a problem, then more liquid scintillator detection elements are added in a way to increase the solid angle (as viewed from the SL spot) and hence increase neutron detection efficiency. If there are candidate neutron signals, more elements far enough away from the SL spot (up to 1.5 m) are added so that TOF measurements with excellent resolution can be used to measure the neutron energy.

In the event of tentative identification of real neutrons emerging from the SL spot, pulse shape analysis will be effected. Conventional PSD use for neutron/gamma separation relies on a summary of the pulse shape contained in two numbers, roughly equivalent to the magnitude of the fast and slow components of light. The difference of these two numbers (or times containing that information) becomes a single "PSD" variable which is used to distinguish neutrons and gammas. To check a claim of the observation of neutrons, the entire waveform of the PMT pulses is digitized to be sure that the PSD electronics was not fooled by some bizarre noise pulse.

At least two means can be used for such wave-form digitization. At a very low rate, one waveform at a time can be digitized by an oscilloscope, and transmitted to the computer via GPIB interface. For higher rate, wave form digitizers are used which have been developed for use in high energy or nuclear physics. For example, a French group has developed a 100-MHz 6-bit waveform sampling scheme for use in electron-neutron separation in lithium-loaded liquid scintillator NE320, with very encouraging results. They demonstrate not only improved neutron gamma separation compared to traditional PSD, but also the ability to recognize and reject sources of noise such as impedance mismatches and multiple pulsing.

Also, a Boston University group has developed a 200-MHz 8-bit waveform digitizer for signals from the liquid scintillator of the MACRO magnetic monopole search. Even more ambitiously, a Brookhaven National Laboratory and Columbia University group has produced Fastbus-interfaced 500-MHz digitizers for use in the rare kaon decay experiment BNL E787. Each of their 200 channels has 8-bit dynamic range, zero suppression on the fly, deep memory up to 500 μs, and fast readout time 100 μs for the whole system.

VII.4.4.4 Moderation of the Neutrons while escaping the SL sphere

At least initially, the SL burst and source of neutrons will be in the center of a sphere of water with radius of about 2–3 cm. Using available total cross sections for n-p, n-d, and n-O scattering, the mean path in $H_2O$ or $D_2O$ is found to be about 4 cm for 2.5 MeV neutrons, and about 10 cm for 14 MeV neutrons. Hence, depending upon our setup, a neutron may have up to 50% chance of scattering off a proton on the way out of the sphere, thus degrading its energy and perhaps its timing. This will not be a serious problem for the initial neutron search. Other non-hydrogenous liquids, are possible, e.g., hydrocarbons in which hydrogen has been replaced by chlorine or fluorine. If such liquids replace water in the sphere, then neutron energy loss while exiting the sphere would be reduced even when scattering does occur.

VII.4.4.5 Summary of the Neutron Detection Method

With the above-described detection system, neutrons generated through D-D or D-T fusion in the SL bubble collapse would be characterized by:

Energy disposition in the liquid scintillator (and subsequent PMT pulse) consistent with monoenergetic source of neutrons, as modeled by MCNP and scale calibrated using $^{252}$Cf and light pulsers, etc.

Time-of-flight spectrum consistent with monoenergetic source of neutrons, with correct absolute energy as calibrated using $^{252}$Cf and light pulsers, etc.

Pulse-shapes consistent with neutrons and inconsistent with gammas at high confidence level using traditional PSD.

Pulse-shapes consistent only with neutrons using more modern wave-form digitizing.

Timing correlation (good to few ns out of many μs) with the SL visible light flash.

Presence of signals when field is strong enough to cause SL and absence of signals when sound field amplitude is just below threshold for SL.

Presence of signals when fusion reactants (D-D or D-T) are present in bubble and absence of signal when only ordinary hydrogen-1 and/or helium is present.

In contrast, background in our search should fail most of the above tests. Moreover, the background rate in several redundant ways can be measured by loosening or eliminating the above criteria in various combinations. Since the above method adds time-of-flight and time-correlation cuts to the desired background rejection should be attainable. If a signal does exist, not only will it thus be virtually background-free, but all the above criteria will allow it to be conclusively associated with the SL bubble collapse.

VIII GENERAL

Many other forms of the invention exist each differing from the other in matters of detail only.

The invention has been generally described with reference to air being degassed in the bubble and water being the liquid. It is possible to have many other variations. As illustrated in FIG. 3, the gas there is nitrogen. Different degrees of doping with argon are illustrated. The intensity of air cell varies according to these characteristics and also the degree to which gas saturates the liquid. Other than water, liquids can, for instance, be hydrocarbon, different oils, and other liquid combinations, for instance liquid nitrogen and liquid argon. Different gases such as oxygen, helium, nitrogen, argon, chlorine, neon, krypton, hydrogen and $SF_6$ can be used.

For instance, in some situations it may be possible to trap more than one bubble in the liquid at different locations or planes, and to obtain energy transfer from each of those bubbles in accordance with the principles of the invention. In other cases it is possible to develop appropriate chemical compounds or products under the action of the energy in the bubble. The high heat and pressure in the bubble would lend itself to such product developments.

In yet other variations it is possible to focus or spot a laser into an area of the liquid, and create the zone for a bubble of gas to be performed. The bubble is found as gas dissolves out of the liquid into the heated area.

In different variation the shape of the container can be selected as appropriate, for instance, cylindrical, cubic, or elongated as required. The walls of the container could be of any suitable material. For instance, Plexiglas, plastic or metal would also be operable.

Although the temperature to which the liquid is cooled is indicated to be about 1° C., it is possible, for instance, using liquid nitrogen, to have lower temperatures in the container or cell.

In other cases the rate of repetition could be less than 1,000 cycles per second or greater than 100,000 cycles per second, namely as high as 1 million cycles per second.

The invention is to be determined solely in terms of the following claims.

IX. BIBLIOGRAPHY

Arfken, G. 1985: *Mathematical Methods for Physicists*, Academic Press.

Barber, B., Löfstedt, R., and Putterman, S. 1991: "Sonoluminescence," J. Acoust. Soc. Am. 89, 1885.

Barber, B. and Putterman, S. 1991: "Observation of synchronous picosecond sonoluminescence," Nature 352, 318–320.

Barber, B., Hiller, R., and Putterman, S. 1992 (Barber et al. 1992a): "Synchronous picosecond sonoluminescence," Proc. 1992 CLEO/QELS, 55.

Barber, B., Hiller, R., Arisaka, K., Fetterman, H., and Putterman, S. 1992 (Barber et al. 1992b): "Resolving the picosecond characteristics of synchronous sonoluminscence," J. Acoust. Soc. Am. 91, 3061–3063.

Battino, R., Rettich, T., and Tominaga, T. 1984: "The solubility of Nitrogen and air in liquids," J. Phys. Chem. Ref. Data 13, 563–600.

Battino, R., Banzhof, M., Bogan, M., and Wilhelm, E. 1972: "Apparatus for Rapid Degassing of Liquids, Part III," Anal. Chem. 54, 806–807.

Beuthe, H. 1932: "Uber den Einfluss der Ultraschallwellen auf Chemische Prozese," [On the Influence of Ultrasound on Chemical Processes] Z. Phys. Chem. A 163, 161–171.

Beyer, W. ed. 1981: *CRC Standard Mathematical Tables*, CRC Press Inc.

Crum, L. and Reynolds, G. 1985: "Sonoluminescence Produced by 'Stable' Cavitation," J. Acoust. Soc. Am. 78, 137–139.

Eisberg, R. and Resnick, R. 1974: *Quantum Physics of Atoms, Molecules, Solids, Nuclei and Particles*, Wiley and Sons.

Finch, R. 1965: "Influence of Radiation on the Cavitation Threshold of Degassed Water," J. Acoust. Soc. Am. 36, 2287–2292.

Finch, R. and Wang, T. 1966: "Visible Cavitation in Liquid Helium," J. Acoust. Soc. Am. 93, 511–514.

Finch, R., Wang, T., Kagiwada, R., Barmatz, M., and Rudnick, I. 1966: "Studies of the Threshold-of-Cavitation Noise in Liquid Helium," J. Acoust. Soc. Am. 40, 211–218.

Flannery, B., Tcukolsky, S. and Vetterling, W. 1988: *Numerical Recipes in C*, Cambridge Univ. Press.

French, A. 1971: *Vibration and Waves*, Norton.

Frenzel, H. and Schultes, H. 1934: "Luminescenz im Ultraschallbeschickten Wasser," (Luminescence in Ultrasonically Driven Water) Z. Phys. Chem. B 27, 421–424.

Gaitan, F. 1990: Ph.D. Thesis, National Center for Physical Acoustics, University of Mississippi.

Gaitan, F. and Crum, L. 1990: "Sonoluminescence from Single Bubbles," J. Acoust. Soc. Am. Suppl. 1, 87, S141.

Hiller, R., Putterman, S., and Barber, B. 1992: "Spectrum of synchronous picosecond sonoluminescence," submitted to Phys. Rev. Lett. May, 1992.

Hueter, T. 1955: *Sonics*, Wiley & Sons.

Jenkins, F. and White, H. 1957: *Fundamentals of Optics*, McGraw Hill.

Kinsler, L., Frey, A., Coppens, A. and Sanders, J. 1982: *Fundamental of Acoustics*, Wiley & Sons.

Kurochkin, A., Smorodov, E., Valitov, R., and Margulis, M. 1986: "Study of the Mechanism of Sonoluminescence, II, Form of the Light Pulse in Sonoluminescence," Russ. J. Phys. Chem. 60, 731–734. (Zh. Fiz. Khim. 60, 1234–1238)

Landau, L. and Lifshitz, E. 1986: *Fluid Mechanics*, Pergamon.

Leonard, R. 1950: "The Attenuation of Sound in Liquids by a Resonator Method," Technical Report, UCLA.

Löfstedt, R., Barber, B., Hiller, R., and Putterman, S. 1992, "Limitations of the hydrodynamical theory of cavitation-induced sonoluminescence," J. Acoust. Soc. Am. 90, 2331.

Löfstedt, R., and Putterman, S. 1991: "Theory of Long Wavelength Acoustic Radiation Pressure," J. Acoust. Soc. Am. 90, 2027–2033. Margulis, M. 1985: "Sonoluminscence and sonochemical reactions in cavitation fields. A review," Ultrasonics 23, 157–168.

Prosperetti, A. 1986: *Frontiers in Physical Acoustics*, (Sette, D. ed.) North-Holland. 149–188.

Richards, W. and Loomis, A. 1927: "The *Chemical Effects of High frequency Sound Waves I. A Preliminary Survey*," J. Am. Chem. Soc. 49, 3086–3100.

Rayleigh, Lord 1917: "On the pressure developed in a liquid during the collapse of a spherical cavity," Phil. Mag. 34, 94–98.

Saksena, T. and Nyborg, W. 1970: "Sonoluminescence from Stable Cavitation," J. Chem. Phys. 53, 1722–1733.

Schmitt, F., Johnson, C. and Olson, A. 1929: "Oxidations Promoted by Ultrasonic Radiation," J. Am. Chem. Soc. 51, 370–375.

Sehgal, C. Sutherland, R., and Verrall, R. 1976: "Sonoluminescence from water containing dissolved gases," J. Phys. Chem. 84, 525–528.

Verrall, R. and Sehgal, C. 1987: "Sonoluminescence," Ultrasonics 25, 29–30.

Vigoureux, P. 1950: *Ultrasonic*, Chapman & Hall.

Walton, A. and Reynolds, G. 1984: "Sonoluminescence," Adv. Phys. 33, 595–660.

Weast, R. ed. 1985: *CRC Handbook of Chemistry and Physics*, CRC Press Inc.

Wilson, O. 1988: *Introduction to Theory and Design of Sonar Transducers*, Peninsula.

Young, F. 1976: "Sonoluminescence from water containing dissolved gases," J. Acoust. Soc. Am. 60, 100–104

We claim:

1. A method of converting acoustic energy into a different energy form comprising:

creating a gaseous bubble in a liquid in a container, locating the bubble in a liquid under the action of acoustic energy applied to the liquid, compressing and decompressing the bubble under the action of resonating pressure applied to the liquid by the acoustic energy, increasing the resonating pressure to generate from the bubble an emission of the different energy form, and sensing selectively at least one of a characteristic of the different energy form, bubble or acoustic energy and feeding back changes in the characteristic to regulate the generation of acoustic energy thereby to sustain the emission generation of the different energy form.

2. A method as claimed in claim 1 including sealing the container against the ingress or egress at least one of the liquid or gas and forming the bubble after sealing.

3. A method as claimed in claim 2 including forming the gas bubble by subjecting a selected area of the liquid in the container to a heat sufficient to form a gas from the liquid in the area.

4. A method as claimed in claim 2 including forming the gas by boiling liquid in an area to form a cavity.

5. A method as claimed in claim 2 including forming the gas by electrolyzing the liquid to form a gas.

6. A method as claimed in claim 2 including degassing the liquid to a predetermined level prior to sealing the container.

7. A method as claimed in claim 2 including introducing a selected gas to the liquid prior to sealing the container.

8. A method as claimed in claim 2 including degassing the liquid to a predetermined amount and adding a selected gas to a predetermined level prior to sealing the container.

9. A method as claimed in claim 1 wherein the different energy form is light energy.

10. A method as claimed in claim 9 wherein the light energy includes pulses of a duration of less than about 100 picoseconds, and having a peak power of about 100 milliwatts, a spectrum of about 200 nanometers to about 700 nanometers and a repetition rate between about 100,000 cycles per second to about 1,000 cycles per second.

11. A method as claimed in claim 1 wherein the bubble has a maximum radius under the action of the acoustic pressure varies from between about 10 microns to 50 microns at a predetermined time of a first pressure cycle applied by the acoustic pressure to an ambient radius of between about 10 and 2 microns at a second pressure cycle applied by the acoustic pressure.

12. A method as claimed in claim 1 wherein the bubble has a maximum radius between 10 microns and 50 microns during first predetermined time of the cycle during which pressure is applied by acoustic energy, and is an ambient radius of less than about 2 microns during another time period of when pressure is applied by acoustic energy.

13. A method as claimed in claim 12 wherein a decrease in the maximum radius from about 10 to 50 microns during the one time of the pressure cycle to an ambient radius of less than about 2 microns in the pressure cycle causes the emission of light energy.

14. A method as claimed in claim 13 wherein a maximum radius would be about 50 microns and the acoustic pressure would be about 1.3 Atmospheres.

15. A method as claimed in claim 1 wherein the liquid is selected from the group of water, oil, liquid nitrogen, and liquid argon.

16. A method as claimed in claim 1 wherein the gas is selected from the group of air, oxygen, xenon, helium, nitrogen, deuterium, tritium, argon, chlorine, neon, krypton, hydrogen and $SF_6$.

17. A method as claimed in claim 16 wherein the gas is selected from the group of air, oxygen, xenon, helium, nitrogen, deuterium, tritium, argon, chlorine, neon, krypton, hydrogen and $SF_6$.

18. A method as claimed in claim 1 including generating heat energy as the different energy form.

19. A method as claimed in claim 18 wherein the temperature of the heat energy is greater than about 50,000 K.

20. A method as claimed in claim 1 wherein the acoustic energy causes a bubble to collapse in size to less than about 5 microns ambient radius.

21. A method as claimed in claim 1 wherein the acoustic energy causes a bubble to collapse in size to less than about 2 microns ambient radius.

22. A method as claimed in claim 1 wherein prior to generating the different energy form the size of the bubble is greater than about 10 microns and after the generation of the different energy form the size of the bubble is less than about 5 microns.

23. A method as claimed in claim 22 wherein the different energy form is light energy.

24. A method as claimed in claim 1 wherein prior to generating the different energy form the size of the bubble is greater than about 10 microns and after the generation of the different energy form the size of the bubble is less than 2 microns.

25. A method as claimed in claim 24 wherein the different energy form is light energy.

26. A method as claimed in claim 1 wherein the acoustic energy creates an imploding shock wave emanating in the gas in the bubble.

27. A method as claimed in claim 1 including applying a spherical imploding shock wave to the bubble, the shock wave having a central focal point and the shock wave creating a temperature adjacent to a focal point in a range of greater than about $10^8$ K.

28. A method as claimed in claim 27 wherein the shock wave reflects from the focal point and attains the temperature greater than $10^8$ K. after reflection from the focal point.

29. A method as claimed in claim 28 wherein the temperature of $10^8$ K. is attained at less than about 100 Angstroms from the focal point of the spherical shock wave.

30. A method as claimed in claim 29 wherein the gas includes at least deuterium and tritium and the different energy form includes the generation of fusion.

31. A method as claimed in claim 27 including locating deuterium and tritium gas in the bubble and wherein the shock wave generates a different energy form including generating at least one neutron per second.

32. A method as claimed in claim 1 wherein the characteristic of the different energy form being sensed includes at least one of the repetition rate of the occurrence of different energy form when such energy form are pulses, and the intensity of such energy form.

33. A method as claimed in claim 32 wherein both the frequency between recurrent pulses of the different energy form and the intensity of the energy form is sensed.

34. A method as claimed in claim 33 wherein sensing of the characteristic of the different energy form is applied to control the frequency and amplitude of the acoustic energy applied to the liquid.

35. A method as claimed in claim 33 wherein the different energy form is light energy.

36. A method as claimed in claim 32 wherein sensing of the characteristic of the different energy form is applied to control the frequency and amplitude of the acoustic energy applied to the liquid.

37. A method as claimed in claim 36 wherein the different energy form is light energy.

38. A method as claimed in claim 32 wherein the different energy form is light energy.

39. A method as claimed in claim 1 wherein sensing of the different characteristic is applied to control at least one of the frequency and amplitude of the acoustic energy applied to the liquid.

40. A method as claimed in claim 39 wherein the different energy form is light energy.

41. A method as claimed in claim 39 wherein the different energy form is light energy.

42. A method as claimed in claim 1 wherein the different energy form outputs energy at the same frequency as the acoustic energy is applied to the liquid.

43. A method as claimed in claim 42 wherein the different energy form is light energy.

44. A method of determining the existence of fluorescence in a sample comprising:

applying the energy conversion method of claim 1 to generate a light energy, applying the light energy to the sample, obtaining an output of the light energy, obtaining at least one of a temporal characteristic or an output spectrum from the sample and determining a difference between the light energy and the sample temporal characteristic or spectrum as a measure of the fluorescence in the sample.

45. A method as claimed in claim 44 including obtaining multiple fluorescent spectra or at the same moment from the sample, the multiple spectra being indicative of multiple different fluorescences in the sample.

46. A method as claimed in claim 45 wherein the spectrum of the light energy is from about 200 nanometers to 700 nanometers.

47. A method of calibrating a detector comprising applying the method of claim 1 to generate a different energy form wherein the different energy form is light, applying the light to at least one detector, obtaining an output from the light, and from the detector, and calibrating the detector in relation to the difference between the output from the light and the detector.

48. A method as claimed in claim 47 including calibrating an array of detectors for transit time spread comprising applying the light energy to the multiple detectors and obtaining respective outputs from the detectors, and calibrating the detectors in relation to the respective outputs and the output of the light energy.

49. A method as claimed in claim 1 including cooling the liquid below about 40° C.

50. A method as claimed in claim 1 including cooling the liquid below about 10° C.

51. A method as claimed in claim 1 including the liquid to about 1° C.

52. A method as claimed in claim 1 including doping the gas bubble with a second selected gas.

53. A method as claimed in claim 1 wherein the gas is a mixture of deuterium and tritium and wherein the gas is doped with a second gas, such second gas being selectively Argon.

54. An apparatus for converting acoustic energy into a different energy form comprising:

a container for a liquid containing a gaseous bubble in a liquid in the container, means for applying acoustic energy to the container thereby locating the bubble in the liquid under the action of the acoustic energy applied to the liquid, means for compressing and decompressing the bubble under the action of resonating pressure applied to the liquid by the acoustic energy, means for increasing the resonating pressure to generate from the bubble an emission of the different energy form, and means for sensing selectively at least one of a characteristic of the different energy form, bubble or acoustic energy and means for feeding back changes in the characteristic thereby to sustain the generation of the different energy form.

55. Apparatus as claimed in claim 54 including means for sealing the container against the ingress or egress of at least one of liquid or gas and forming the bubble after sealing.

56. Apparatus as claimed in claim 55 including means for forming the gas bubble by subjecting a selected area of the liquid in the container to a heat sufficient to form a gas from the liquid in the area.

57. Apparatus as claimed in claim 55 including means for forming the gas by boiling liquid in an area to form a cavity.

58. Apparatus as claimed in claim 55 including means for forming the gas by electrolyzing the liquid to form a gas.

59. Apparatus as claimed in claim 55 including means for degassing the liquid to a predetermined level prior to sealing the container.

60. Apparatus as claimed in claim 55 including means for introducing a selected gas to the liquid prior to sealing the container.

61. Apparatus as claimed in claim 55 including means for degassing the liquid to a predetermined level and adding a selected gas to a predetermined amount prior to sealing the container.

62. Apparatus as claimed in claim 54 wherein the different energy form is light energy.

63. Apparatus as claimed in claim 62 wherein the generated light energy includes pulses of a duration of less than about 100 picoseconds, and having a peak power of about 100 milliwatts, a spectrum of about 200 nanometers to about 700 nanometers and a repetition rate between about 100,000 cycles per second to 1,000 cycles per second.

64. Apparatus as claimed in claim 54 wherein the bubble has a maximum radius under the action of the acoustic pressure varies from between about 10 microns to 50 microns at a predetermined time of first pressure cycle applied by the acoustic pressure to an ambient radius of between about 10 and 2 microns at a second pressure cycle applied by the acoustic pressure.

65. Apparatus as claimed in claim 54 wherein the bubble has a maximum radius between 10 microns and 50 microns during one predetermined time of the cycle during which pressure is applied by acoustic energy, and is an ambient radius of less than about 2 microns during another time period of when pressure is applied by acoustic energy.

66. Apparatus as claimed in claim 65 wherein a decrease in the maximum radius from about 10 to 50 microns during the one time of the pressure cycle to an ambient radius of less than about 2 microns in the pressure cycle causes the emission of light energy.

67. Apparatus as claimed in claim 66 wherein the maximum radius is about 50 microns and the acoustic pressure would be about 1.3 Atmospheres.

68. Apparatus as claimed in claim 54 wherein a liquid is selected from the group of water, oil, liquid nitrogen and liquid argon.

69. Apparatus as claimed in claim 54 wherein the gas is selected from the group of air, oxygen, xenon, helium, nitrogen, deuterium, tritium, argon, chlorine, neon, krypton, hydrogen and $SF_6$.

70. Apparatus as claimed in claim 69 wherein the gas is selected from the group of air, oxygen, xenon, helium, nitrogen, deuterium, tritium, argon, chlorine, neon, krypton, hydrogen and $SF_6$.

71. Apparatus as claimed in claim 54 including generating heat energy as the different energy form.

72. Apparatus as claimed in claim 71 wherein the temperature of the heat energy is greater than about 50,000 K.

73. Apparatus as claimed in claim 54 wherein the acoustic energy causes a bubble to collapse in size to less than about 5 microns ambient radius.

74. Apparatus as claimed in claim 54 wherein the acoustic energy causes a bubble to collapse in size to less than about 2 microns ambient radius.

75. Apparatus as claimed in claim 54 wherein prior to generating the different energy form the size of the bubble is greater than about 10 microns and after the generation of the different energy form the size of the bubble is less than 5 microns.

76. Apparatus as claimed in claim 75 wherein the different energy form is light energy.

77. Apparatus as claimed in claim 76 wherein the different energy form is light energy.

78. Apparatus as claimed in claim 54 wherein prior to generating the different energy form the size of the bubble is greater than about 10 microns and after the generation of the different energy form the size of the bubble is less than 2 microns.

79. Apparatus as claimed in claim 54 wherein the acoustic energy creates an imploding shock wave emanating in the gas in the bubble.

80. Apparatus as claimed in claim 54 including applying a spherical imploding shock wave to the bubble, the shock wave having a central focal point and the shock wave creating a temperature adjacent to the focal point in a range of greater than about $10^4$ K.

81. Apparatus as claimed in claim 80 wherein the shock wave reflects from the focal point and attains the temperature greater than $10^4$ K. after reflection from the focal point.

82. Apparatus as claimed in claim 81 wherein the temperature of $10^8$ K. is attained at less than about 100 Angstroms from the focal point of the spherical shock wave.

83. Apparatus as claimed in claim 82 including means for locating deuterium and tritium gas in the bubble and wherein the shock wave generates a different energy form of at least one neutron per second.

84. Apparatus as claimed in claim 82 wherein the gas includes at least deuterium and tritium and the different energy form includes the generation of fusion.

85. Apparatus as claimed in claim 54 wherein the sensing means including means for sensing at least one of the repetition rate the occurrence of different energy form when such energy form appear as pulses, and the intensity of such energy form.

86. Apparatus as claimed in claim 85 including means for sensing both the time between recurrent pulses of the different energy form and the intensity of the energy form.

87. Apparatus as claimed in claim 86 wherein sensing of the different characteristic is applied to means for controlling at least one of the frequency and amplitude of the acoustic energy.

88. Apparatus as claimed in claim 86 wherein sensing of the characteristic of the different energy form is applied to control the frequency and amplitude of the acoustic energy.

89. Apparatus as claimed in claim 85 wherein sensing of the characteristic of the different energy form is applied to means for controlling the frequency and amplitude of the acoustic energy.

90. Apparatus as claimed in claim 85 wherein sensing of the characteristic of the different energy form is applied to control the frequency and amplitude of the acoustic energy.

91. Apparatus for determining the existence of fluorescence in a sample comprising means for applying the energy obtained from the apparatus of claim 54 to generate a light energy means for applying the light energy to sample, means for determining an output for the light energy, means for obtaining at least one of a temporal characteristic or an output spectrum from the sample, and means for determining a difference between the light energy and at least one of the temporal characteristic or the sample spectrum as a measure of the characteristics of fluorescence in the sample.

92. Apparatus for calibrating at least one detector comprising means for applying the energy obtained by the apparatus of claim 54 to obtain a light energy, means for applying the light energy to the detector to obtain an output, means for obtaining from the apparatus an output of the light energy, and means for calibrating the detector in relation to the difference between the output and the detector output.

93. Apparatus as claimed in claim 54 including means for cooling the liquid below about 40° C., and preferably to about 1° C.

94. A method of measuring a characteristic of a liquid comprising:

creating a gaseous bubble in a liquid in a container, the liquid having a quantity of dissolved gas:

locating the bubble in a liquid under the action of acoustic energy applied to the liquid:

compressing and decompressing the bubble under the action of resonating pressure applied to the liquid by the acoustic energy, scattering a laser light off the bubble to obtain a measure of the radius of the compressing and decompressing bubble as a function of time, and applying a diffusion equation to the varying radius over time to provide a measure of concentration of gas dissolved in the liquid.

95. A method of seeding a gas in a liquid to create a bubble of gas in a liquid comprising degassing a liquid to a predetermined level, sealing the liquid against the ingress and egress of liquid, and applying heat to a predetermined area in the liquid to form a cavity or gas.

96. Apparatus for measuring a characteristic of a liquid comprising:

a container for liquid containing a dissolved gas, means for applying acoustic energy to the container for locating the bubble in a liquid under the action of the acoustic energy applied to the liquid:

means for compressing and decompressing the bubble under the action of resonating pressure applied to the liquid by the acoustic energy, means for scattering a laser light off the bubble to obtain a measure of the radius of the bubble as a function of time, and means for applying a diffusion equation to the varying radius over time to provide a measure of concentration of gas dissolved in the liquid.

* * * * *

UNITED STATES PATENT AND TRADEMARK OFFICE
CERTIFICATE OF CORRECTION

PATENT NO. : 5,659,173

DATED : August 19, 1997

INVENTOR(S) : Seth J. Putterman, et al.

It is certified that error appears in the above-identified patent and that said Letters Patent is hereby corrected as shown below:

```
On the title page
```
At section (75), under "Inventors:", "Paul" should read —P.—.

At section (75), under "Inventors:", "Anthony" should read —A.—.

At section (75), under "Inventors:", "Maire Johanna" should read —M.J.—.

At section (57), under "Abstract", line 14, "milliWatts" should read —milliwatts—.

At column 3, line 25, "must should read —just—.

At column 4, line 16, "once" should read —one—.

At column 8, line 8, "that than" should read —than that—.

At column 8, line 37, please delete "g".

At column 14, line 44, "remove" should read —removed—.

At column 18, line 67, insert —to— after the word "used".

At column 20, line 59, "phonon" should read —photon—.

At column 23, line 33, "that" should read —than—.

UNITED STATES PATENT AND TRADEMARK OFFICE
CERTIFICATE OF CORRECTION

PATENT NO. : 5,659,173

DATED       : August 19, 1997

INVENTOR(S) : Seth J. Putterman, et al.

It is certified that error appears in the above-identified patent and that said Letters Patent is hereby corrected as shown below:

At column 23, line 47, delete "of" after "energy".

At column 25, line 45, "are" should read —is—.

At column 32, claim 51, line 7, insert —cooling— after "including".

At column 34, claim 91, line 37, insert —:— after "comprising".

At column 34, claim 92, line 49, insert —:— after "comprising".

At column 35, claim 95, line 11, insert —:— after "comprising".

Signed and Sealed this

Fifth Day of January, 1999

*Attest:*

*Attesting Officer*

*Acting Commissioner of Patents and Trademarks*

UNITED STATES PATENT AND TRADEMARK OFFICE
CERTIFICATE OF CORRECTION

PATENT NO. : 5,659,173

DATED : August 19, 1997

INVENTOR(S) : Seth J. Putterman, et al.

It is certified that error appears in the above-identified patent and that said Letters Patent is hereby corrected as shown below:

Column 1, first paragraph, please insert:

——This invention was made with Government support under Grant No. DE-FG03-92ER12124, awarded by the Department of Energy. The Government has certain rights in this invention.——

Signed and Sealed this

Second Day of March, 1999

*Attest:*

*Attesting Officer*

Q. TODD DICKINSON

*Acting Commissioner of Patents and Trademarks*